(12) United States Patent
Yokoyama et al.

(10) Patent No.: US 12,098,440 B2
(45) Date of Patent: Sep. 24, 2024

(54) STEEL SHEET AND METHOD FOR PRODUCING SAME

(71) Applicant: NIPPON STEEL CORPORATION, Tokyo (JP)

(72) Inventors: Takafumi Yokoyama, Tokyo (JP); Yusuke Tsunemi, Tokyo (JP); Tatsuya Obuchi, Tokyo (JP); Akinobu Minami, Tokyo (JP); Takuya Kuwayama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/033,729

(22) PCT Filed: Aug. 31, 2021

(86) PCT No.: PCT/JP2021/031995
§ 371 (c)(1),
(2) Date: Apr. 25, 2023

(87) PCT Pub. No.: WO2022/102218
PCT Pub. Date: May 19, 2022

(65) Prior Publication Data
US 2023/0399712 A1    Dec. 14, 2023

(30) Foreign Application Priority Data

Nov. 11, 2020    (JP) .................................. 2020-188288

(51) Int. Cl.
*C22C 38/58*    (2006.01)
*B32B 15/01*    (2006.01)
(Continued)

(52) U.S. Cl.
CPC .............. *C21D 9/46* (2013.01); *B32B 15/013* (2013.01); *B32B 15/04* (2013.01); *B32B 15/043* (2013.01); *B32B 15/18* (2013.01); *C21D 1/18* (2013.01); *C21D 6/001* (2013.01); *C21D 6/002* (2013.01); *C21D 6/004* (2013.01); *C21D 6/005* (2013.01); *C21D 6/007* (2013.01); *C21D 6/008* (2013.01); *C21D 8/02* (2013.01); *C21D 8/0205* (2013.01); *C21D 8/0226* (2013.01); *C21D 8/0236* (2013.01); *C21D 8/0263* (2013.01); *C21D 8/0273* (2013.01); *C21D 8/0278* (2013.01); *C22C 38/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01);
(Continued)

(58) Field of Classification Search
CPC ........ C21D 2211/001; C21D 2211/002; C21D 2211/003; C21D 2211/005; C21D 2211/007; C21D 2211/008; C21D 1/18; C21D 9/46; C21D 6/001; C21D 6/002; C21D 6/004; C21D 6/005; C21D 6/007; C21D 6/008; C21D 8/02; C21D 8/0205; C21D 8/0226; C21D 8/0236; C21D 8/0263; C21D 8/0273; C21D 8/0278; B32B 15/013; B32B 15/04; B32B 15/043; B32B 15/18; C22C 38/00; C22C 38/001; C22C 38/002; C22C 38/005; C22C 38/008; C22C 38/02; C22C 38/04; C22C 38/06; C22C 38/08; C22C 38/10; C22C 38/12; C22C 38/14; C22C 38/16; C22C 38/22; C22C 38/28; C22C 38/38; C22C 38/42; C22C 38/44; C22C 38/46; C22C 38/50; C22C 38/52; C22C 38/58; C22C 38/60; C22C 38/18; C22C 38/20; C22C 38/24; C22C 38/26; C22C 38/32; C23C 2/02; C23C 2/0224; C23C 2/024; C23C 2/06; C23C 2/28; C23C 2/40; C23C 2/285; C23C 30/00; C23C 30/005; C23G 1/08; Y10T 428/12757; Y10T 428/12799; Y10T 428/12965; Y10T 428/12972; Y10T 428/12993

See application file for complete search history.

(56) References Cited

U.S. PATENT DOCUMENTS

2008/0000555 A1    1/2008  Nonaka et al.
2013/0133786 A1    5/2013  Matsuda et al.
(Continued)

FOREIGN PATENT DOCUMENTS

JP    2006-104532 A       4/2006
JP    2009-030081 A   *   2/2009
(Continued)

OTHER PUBLICATIONS

Machine Translation, Kishi et al., JP 2009-030081 A, Feb. 12, 2009. (Year: 2009).*

*Primary Examiner* — Michael E. La Villa
(74) *Attorney, Agent, or Firm* — Birch, Stewart, Kolasch & Birch, LLP

(57) ABSTRACT

Provided are a steel sheet having a predetermined chemical composition, and a steel microstructure comprising, by vol %, ferrite: 1 to 50%, ratio of nonrecrystallized ferrite in the ferrite: 0 to 50%, tempered martensite: 1% or more, retained austenite: 5% or more, fresh martensite: 0 to 10%, total of pearlite and cementite: 0 to 5%, and balance: bainite, and, when analyzing the surface by an EPMA, an area ratio of regions with an $Al_S/Si_S$ ratio of 0.2 or less is 50% or less, and a tensile strength is 980 MPa or more, and a method for producing the same.

16 Claims, No Drawings

(51) Int. Cl.

| | |
|---|---|
| *B32B 15/04* | (2006.01) |
| *B32B 15/18* | (2006.01) |
| *C21D 1/18* | (2006.01) |
| *C21D 6/00* | (2006.01) |
| *C21D 8/02* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/10* | (2006.01) |
| *C22C 38/12* | (2006.01) |
| *C22C 38/14* | (2006.01) |
| *C22C 38/16* | (2006.01) |
| *C22C 38/18* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/32* | (2006.01) |
| *C22C 38/38* | (2006.01) |
| *C22C 38/42* | (2006.01) |
| *C22C 38/44* | (2006.01) |
| *C22C 38/46* | (2006.01) |
| *C22C 38/50* | (2006.01) |
| *C22C 38/52* | (2006.01) |
| *C22C 38/60* | (2006.01) |
| *C23C 2/02* | (2006.01) |
| *C23C 2/28* | (2006.01) |
| *C23C 30/00* | (2006.01) |
| *C23C 2/06* | (2006.01) |
| *C23C 2/40* | (2006.01) |
| *C23G 1/08* | (2006.01) |

(52) U.S. Cl.
CPC .............. *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/42* (2013.01); *C22C 38/44* (2013.01); *C22C 38/46* (2013.01); *C22C 38/50* (2013.01); *C22C 38/52* (2013.01); *C22C 38/58* (2013.01); *C22C 38/60* (2013.01); *C23C 2/02* (2013.01); *C23C 2/0224* (2022.08); *C23C 2/024* (2022.08); *C23C 2/285* (2013.01); *C23C 30/00* (2013.01); *C23C 30/005* (2013.01); *C21D 2211/001* (2013.01); *C21D 2211/002* (2013.01); *C21D 2211/003* (2013.01); *C21D 2211/005* (2013.01); *C21D 2211/008* (2013.01); *C21D 2211/009* (2013.01); *C23C 2/06* (2013.01); *C23C 2/28* (2013.01); *C23C 2/40* (2013.01); *C23G 1/08* (2013.01); *Y10T 428/12757* (2015.01); *Y10T 428/12799* (2015.01); *Y10T 428/12965* (2015.01); *Y10T 428/12972* (2015.01); *Y10T 428/12993* (2015.01)

(56) References Cited

U.S. PATENT DOCUMENTS

| | | |
|---|---|---|
| 2014/0242414 A1 | 8/2014 | Minami et al. |
| 2014/0242416 A1 | 8/2014 | Matsuda et al. |
| 2015/0034218 A1 | 2/2015 | Krizan et al. |
| 2020/0157647 A1 | 5/2020 | Ono et al. |
| 2020/0181729 A1 | 6/2020 | Pipard et al. |
| 2020/0181750 A1 | 6/2020 | Venkatasurya et al. |
| 2021/0207234 A1 | 7/2021 | Takashima et al. |

FOREIGN PATENT DOCUMENTS

| | | |
|---|---|---|
| JP | 2011-17046 A | 1/2011 |
| JP | 2011-184757 A | 9/2011 |
| WO | WO 2013/018741 A1 | 2/2013 |
| WO | WO 2013/051238 A1 | 4/2013 |
| WO | WO 2013/144377 A1 | 10/2013 |
| WO | WO 2017/179372 A1 | 10/2017 |
| WO | WO 2018/190416 A1 | 10/2018 |
| WO | WO 2018/202916 A1 | 11/2018 |
| WO | WO 2018/234938 A1 | 12/2018 |

\* cited by examiner

STEEL SHEET AND METHOD FOR PRODUCING SAME

FIELD

The present invention relates to a steel sheet and a method for producing the same, mainly relates to a high strength steel sheet used as a steel sheet for automobile use and a method for producing the same.

BACKGROUND

In recent years, improvement of the fuel economy of automobiles has been sought from the viewpoint of regulations on amounts of emission of greenhouse effect gases accompanying measures against global warming. Application of high strength steel sheet has been increasing for lightening the weight of automobile bodies and securing collision safety. In particular, recently, the need for high strength steel sheet of a tensile strength of 980 MPa or more has been growing. Further, high strength hot dip galvanized steel sheet which is hot dip galvanized on its surface at portions of car bodies where corrosion resistance is sought is in demand.

The steel sheet used for automobile parts is asked to provide not only strength, but also press-formability, weldability, and other various properties required for shaping the parts. Specifically, from the viewpoint of press-formability, excellent elongation (total elongation in tensile test: El) and stretch flangeability (hole expansion ratio: $\lambda$) are demanded from steel sheet.

In general, along with the increase in strength of steel sheet, the press-formability deteriorates. As means for achieving both higher strength of steel and press-formability, TRIP (transformation induced plasticity) steel sheet utilizing the transformation induced plasticity of retained austenite is known.

PTLs 1 to 3 disclose high strength TRIP steel sheet improved in elongation and hole expansion ratio by controlling the microstructure component fractions to predetermined ranges. Further, PTL 4 describes high strength steel sheet having a predetermined chemical composition, and a microstructure including, in terms of volume fraction, 15% or less of ferrite having an average crystal grain diameter of 2 μm or less, 2% to 15% of retained austenite having an average crystal grain diameter of 2 μm or less, 10% or less of martensite having an average crystal grain diameter of 3 μm or less, and the balance being bainite and tempered martensite having an average crystal grain diameter of 6 μm or less, wherein the average number of cementite grains having a grain diameter of 0.04 μm or more existing in the bainite and tempered martensite grains is 10 or more. and describes that the high strength steel sheet has a 1180 MPa or more tensile strength and has a high elongation and hole expandability and excellent bendability accompanying the same.

PTL 5 discloses TRIP steel sheet improved in stretch flangeability by restricting the area ratio of clump like (low aspect ratio) retained austenite.

PTL 6 discloses high strength TRIP steel sheet having a large amount of work hardening at the initial stage of shaping and excellent shape freezeability and workability by control of the amount of solute Si and amount of solute Mn contained in the retained austenite to predetermined values or more.

Further, excellent weldability is demanded from steel sheet for automobile use in addition to press-formability. In particular, in welding hot dip galvanized steel sheets together or welding a hot dip galvanized steel sheet and unplated steel sheet, liquid metal embrittlement (LME) cracking has to be inhibited. This phenomenon is the cracking occurring due to the tensile stress generated by welding at locations where the zinc which has been converted to a liquid phase by weld input heat penetrates the insides of steel sheet along the grain boundaries resulting in embrittlement.

The fact that such LME cracking occurs more easily in steel the greater the Si contained in the steel is disclosed in PTL 7. Therefore, in this literature, TRIP steel sheet in the TRIP steel of which, instead of part of the Si added for obtaining retained austenite, Al having a similar effect is added, is disclosed. Further, TRIP steel sheet to which Al is added in place of part of the Si is also disclosed in PTLs 8 and 9.

Further, PTL 10 discloses a method of production of hot dip galvanized steel sheet excellent in LME cracking resistance characterized by controlling the atmosphere at the time of heating and annealing on a hot dip galvanization line.

CITATIONS LIST

Patent Literature

[PTL 1] WO2013/051238
[PTL 2] Japanese Unexamined Patent Publication No. 2006-104532
[PTL 3] Japanese Unexamined Patent Publication No. 2011-184757
[PTL 4] WO2017/179372
[PTL 5] WO2018/190416
[PTL 6] WO2013/018741
[PTL 7] WO2018/202916
[PTL 8] Japanese Unexamined Patent Publication No. 2011-17046
[PTL 9] WO2013/144377
[PTL 10] WO2018/234938

SUMMARY

Technical Problem

In this technical field, there is an ongoing need for steel sheet achieving both higher strength and press-formability while excellent in LME cracking resistance. In steel sheet of the prior art as well, there is still room for improvement from these viewpoints.

Therefore, an object of the present invention is to provide a steel sheet excellent in press-formability and LME cracking resistance of spot welded parts and a method for producing the same.

Solution to Problem

The inventors engaged in in-depth studies for achieving the above object and as a result obtained the following findings:

Regarding the LME cracking resistance of spot welded parts, they discovered that the average composition of the steel of course and also the chemical composition of the steel sheet surface layer part are extremely important. Specifically, they discovered that if the ratio of the Al concentration at the steel sheet surface ($Al_S$) and the Si concentration at the steel sheet surface ($Si_S$) becomes a predetermined range, the LME cracking resistance is greatly improved. The detailed mechanism is not clear, but the possibility that the Al at the steel sheet surface layer inhibits penetration of liquid Zn inside the steel sheet may be considered. In more detail, they discovered that when analyzing the steel sheet surface by an EPMA, if the area ratio of the regions with an $Al_S/Si_S$ ratio of 0.2 or less is 50% or less, an effect of improvement appears. Further, regarding the press-formability, they discovered that in particular reducing the ratio of nonrecrystallized ferrite in the ferrite is important. Specifically, they discovered that by reducing the ratio of nonrecrystallized ferrite in the ferrite to 50% or less, it is possible to make the steel microstructure more isotropic, and therefore in addition to improvement of the elongation, the hole expandability can also be improved. Further, regarding improvement of the LME cracking resistance, they discovered that in order to raise the Al concentration at the steel sheet surface, it is necessary to add a relatively large amount of Al, but in order to avoid formation of fine and relatively large amounts of AlN particles due to such addition of Al and recrystallization of ferrite being remarkably inhibited due to the pinning effect of the AlN particles, it is effective to add Ti and fix the solute N in the steel as TiN.

The present invention is realized based on the above discoveries and specifically is as follows:

(1) A steel sheet having a chemical composition comprising, by mass %,
C: 0.15 to 0.30%,
Si: 0.30 to 1.50%,
Mn: 1.40 to 3.49%,
P: 0.050% or less,
S: 0.0100% or less,
Al: 0.30 to 1.50%,
Ti: 0.001 to 0.100%,
N: 0.0100% or less,
O: 0.0100% or less,
Cr: 0 to 1.00%,
Mo: 0 to 1.00%,
Cu: 0 to 1.00%,
Ni: 0 to 1.00%,
Co: 0 to 1.00%,
W: 0 to 1.00%,
Sn: 0 to 1.00%,
Sb: 0 to 0.50%,
Nb: 0 to 0.200%,
V: 0 to 1.00%,
B: 0 to 0.0050%,
Ca: 0 to 0.0100%,
Mg: 0 to 0.0100%,
Ce: 0 to 0.0150%,
Zr: 0 to 0.0100%,
La: 0 to 0.0150%,
Hf: 0 to 0.0100%,
Bi 0 to 0.0100%,
REM other than Ce and La: 0 to 0.0100%, and
balance: Fe and impurities, and
a steel microstructure in a range of ⅛ thickness to ⅜ thickness centered on ¼ thickness from the surface comprising, by vol %,
ferrite: 1 to 50%,
ratio of nonrecrystallized ferrite in the ferrite: 0 to 50%,
tempered martensite: 1% or more,
retained austenite: 5% or more,
fresh martensite: 0 to 10%,
total of pearlite and cementite: 0 to 5%, and
balance: bainite, and
when analyzing the surface by an EPMA, an area ratio of regions with an $Al_S/Si_S$ ratio of 0.2 or less is 50% or less, and a tensile strength is 980 MPa or more, where $Al_S$ is a surface Al concentration (mass %), and $Si_S$ is a surface Si concentration (mass %).

(2) The steel sheet according to (1), wherein the chemical composition comprises, by mass %, one or more selected from the group consisting of:
Cr: 0.001 to 1.00%,
Mo: 0.001 to 1.00%,
Cu: 0.001 to 1.00%,
Ni: 0.001 to 1.00%,
Co: 0.001 to 1.00%,
W: 0.001 to 1.00%,
Sn: 0.001 to 1.00%,
Sb: 0.001 to 0.50%,
Nb: 0.001 to 0.200%,
V: 0.001 to 1.00%,
B: 0.0001 to 0.0050%,
Ca: 0.0001 to 0.0100%,
Mg: 0.0001 to 0.0100%,
Ce: 0.0001 to 0.0100%,
Zr: 0.0001 to 0.0100%,
La: 0.0001 to 0.0100%,
Hf: 0.0001 to 0.0100%,
Bi 0.0001 to 0.0100%, and
REM other than Ce and La: 0.0001 to 0.0100%.

(3) The steel sheet according to (1) or (2), wherein the chemical composition satisfies the relationship of the following formula (1) and the ratio of nonrecrystallized ferrite in the ferrite is 10% or less:

$$[N]-(14.01/47.88)\cdot[Ti]\leq 0 \qquad (1)$$

where [N] is the N content (mass %) and [Ti] is the Ti content.

(4) The steel sheet according to any one of (1) to (3), having a hot dip galvanized layer or hot dip galvannealed layer on its surface.

(5) A method for producing the steel sheet according to any one of (1) to (3), comprising:
(A) a hot rolling step comprising rough rolling and finish rolling a slab having the chemical composition according to any one of (1) to (3), wherein the hot rolling step satisfies the conditions of the following (A1) to (A4):
(A1) in the rough rolling, rolling at a steel sheet temperature of 1050 to 1200° C. and a rolling reduction per pass of more than 20% is performed at least two times,
(A2) in the rough rolling, high pressure water descaling satisfying pressure: 10 MPa or more, distance between steel sheet and nozzle tip: 500 mm or less, and angle formed by orientation of nozzle and thickness direction of steel sheet: 3 to 15 degrees is performed at least one time within 10 seconds after being rolled by a rolling pass at a steel sheet temperature of 1050 to 1200° C. and a rolling reduction of more than 20%,
(A3) in the finish rolling, high pressure water descaling satisfying pressure: 2 MPa or more, distance between steel sheet and nozzle tip: 400 mm or less, and angle formed by orientation of nozzle and thickness direction of steel sheet: 3 to 15 degrees is performed at least one time within 3.0 seconds after being rolled by a rolling pass at a steel sheet temperature of 950 to 1100° C. and a rolling reduction of more than 30%, (A4) an elapsed time (s) after a final descaling and until the steel sheet reaches 700° C. satisfies the following formula (2):

[Formula 1]

$$0.03 \le \sum_{t}^{t_f} 10^3 \cdot \sqrt{0.000631 \cdot \exp\left[-\frac{169,000}{8.314 \cdot \{T(t)+273\}}\right]} \cdot \Delta t \le 0.30 \quad (2)$$

t: elapsed time (s) from end of final descaling
T(t): steel sheet temperature (° C.) at elapsed time "t"
$t_f$: elapsed time (s) after final descaling and until steel sheet reaches 700° C.

(B) a pickling step comprising performing bending/unbending deformation on the obtained hot rolled steel sheet at least one time and then performing pickling running the hot rolled steel sheet through a temperature 70 to 90° C. aqueous solution containing 1.0 to 5.0 mol/L of HCl and less than 3.0 mol/L of $Fe^{2+}$ at an average speed of 10 m/min or more for 30 seconds or more, (C) a cold rolling step of cold rolling the pickled hot rolled steel sheet at a rolling reduction of 30 to 75%, (D) a heat treatment step comprising heat treating the obtained cold rolled steel sheet, wherein the heat treatment step satisfies the conditions of the following (D1) to (D5):

(D1) an average heating speed at 650 to Ac1° C. is 1.0 to 5.0° C./s, (D2) the cold rolled steel sheet is held at a peak heating temperature of Ac1+30 to 950° C. for 1 to 500 seconds (soaking), (D3) the soaked cold rolled steel sheet is cooled so that an average cooling speed at a temperature range of 550 to 650° C. is 10 to 100° C./s (first cooling), (D4) the cooling is stopped at Ms-150 to Ms° C. (second cooling), (D5) the cold rolled steel sheet after the second cooling is heated to a temperature region of 330 to 450° C., then held at the temperature region for 50 to 1000 seconds (low temperature holding).

(6) The method for producing the steel sheet according to (5), further comprising hot dip galvanizing or hot dip galvannealing the steel sheet after the first cooling of (D3), the second cooling of (D4), or the low temperature holding of (D5).

Advantageous Effects of Invention

According to the present invention, it is possible to obtain a steel sheet excellent in press-formability and LME cracking resistance of spot welded parts.

DESCRIPTION OF EMBODIMENTS

"Chemical Composition"

First, the reasons for limitation of the chemical composition of the steel sheet according to a present embodiment of the present invention as stated above will be explained. In this Description, the "%" prescribing the chemical composition are all "mass %" unless particularly indicated otherwise. Further, in this Description, the "to" showing ranges of numerical values is used in the sense of including the numerical values described before and after each other as the lower limit value and upper limit value unless particularly indicated otherwise.

[C: 0.15 to 0.30%]

C (carbon) is an element essential for securing strength of steel sheet. To sufficiently obtain such an effect, the C content is 0.15% or more. The C content may also be 0.16% or more, 0.18% or more, or 0.20% or more. On the other hand, if excessively containing C, press-formability and other workability and the weldability sometimes fall. For this reason, the C content is 0.30% or less. The C content may also be 0.28% or less, 0.27% or less, or 0.25% or less.

[Si: 0.30 to 1.50%]

Si (silicon) is an element inhibiting the formation of iron carbides and contributing to improvement of the strength and shapeability. To sufficiently obtain these effects, the Si content is 0.30% or more. The Si content may also be 0.40% or more, 0.50% or more, or 0.70% or more. On the other hand, excessive addition sometimes aggravates LME cracking at the time of welding. Therefore, the Si content is 1.50% or less. The Si content may also be 1.40% or less, 1.20% or less, or 1.00% or less.

[Mn: 1.40 to 3.49%]

Mn (manganese) is a powerful austenite stabilizing element and an element effective for increasing the strength of steel sheet. To sufficiently obtain such an effect, the Mn content is 1.40% or more. The Mn content may also be 1.50% or more, 1.70% or more, or 2.00% or more. On the other hand, excessive addition sometimes causes the press-formability and other workability and the weldability and, further, the low temperature toughness to fall. Therefore, the Mn content is 3.49% or less. The Mn content may also be 3.20% or less, 3.00% or less, or 2.90% or less.

[P: 0.050% or Less]

P (phosphorus) is a solid solution strengthening element and is an element effective for increasing the strength of steel sheet, but excessive addition causes the weldability and toughness to deteriorate. Therefore, the P content is limited to 0.050% or less. The P content is preferably 0.045% or less, 0.035% or less, or 0.020% or less. The P content may also be 0%, but if greatly reducing the P content, the dephosphorization cost becomes high, therefore from the viewpoint of economy, the lower limit is preferably 0.001%.

[S: 0.0100% or Less]

S (sulfur) is an element contained as an impurity and forms MnS in steel to cause deterioration in the toughness and hole expandability. Therefore, as a range where the deterioration in toughness and hole expandability is not notable, the S content is limited to 0.0100% or less. The S content is preferably 0.0050% or less, 0.0040% or less, or 0.0030% or less. The S content may also be 0%, but if greatly reducing the S content, the desulfurization cost becomes high, therefore from the viewpoint of economy, the lower limit is preferably 0.0001%.

[Al: 0.30 to 1.50%]

Al (aluminum) forms retained austenite plus causes the $Al_S/Si_S$ ratio of the steel sheet surface to rise to improve the LME cracking resistance, therefore at least 0.30% is added. The Al content may also be 0.40% or more, 0.50% or more, or 0.60% or more. On the other hand, if excessively adding Al, the effect becomes saturated and in particular a rise in cost is invited. Not only that, the transformation temperature of steel is made to rise and the load at the time of hot rolling is made to increase resulting in a drop in the mechanical properties of the steel sheet being caused in some cases.

Therefore, the upper limit of the Al content is 1.50%. The Al content may also be 1.40% or less, 1.20% or less, or 1.00% or less.

[Ti: 0.001 to 0.100%]

Ti (titanium) is a carbonitride producing element and contributes to increasing the strength of steel sheet by precipitation strengthening. In the embodiments of the present invention, Ti is added for the purpose of fixing the solute N in the steel as TiN. In embodiments of the present invention, Al is added in a 0.30% or more relatively large content, therefore if not adding Ti, sometimes a large number of fine AlN particles are formed. In such a case, due to the pinning effect by the fine AlN particles, at the time of annealing after cold rolling, recrystallization of ferrite is remarkably inhibited, the ductility and hole expandability of the steel sheet deteriorate, and as a result the press-formability falls. Therefore, to fix the solute N in the steel as TiN and inhibit the formation of such fine AlN particles, the Ti content is 0.001% or more. In the embodiments of the present invention, Al has to be added to improve the LME cracking resistance, but due to such addition of Al, sometimes the press-formability falls, therefore from the viewpoint of achieving both LME cracking resistance and press-formability, as explained above, addition of Ti becomes important. The Ti content may also be 0.003% or more, 0.005% or more, 0.010% or more, or 0.015% or more. Furthermore, if adding Ti so as to satisfy the following formula (1), a greater effect is obtained, the ratio of nonrecrystallized ferrite in the ferrite explained in detail later can be reliably decreased, and for example the ratio of nonrecrystallized ferrite in the ferrite can be decreased to 40% or less, preferably 30% or less or 10% or less.

$$[N]-(14.01/47.88)\cdot[Ti]\leq 0 \quad (1)$$

where [N] is the N content (mass %) and [Ti] is the Ti content. On the other hand, even if excessively adding Ti, the effect becomes saturated and a rise in the cost is invited. Not only that, TiC is precipitated in a large amount, therefore sometimes the ductility and hole expandability of the steel sheet deteriorate. For this reason, Ti content is 0.100% or less. The Ti content may also be 0.090% or less, 0.080% or less, or 0.050% or less.

[N: 0.0100% or Less]

N (nitrogen) is an element contained as an impurity. If the content is large, coarse nitrides are formed in the steel and sometimes the bendability and hole expandability are caused to deteriorate. Therefore, the N content is limited to 0.0100% or less. The N content is preferably 0.0080% or less, 0.0060% or less, or 0.0050% or less. The N content may also be 0%, but if greatly reducing the N content, the denitridation cost becomes high, therefore from the viewpoint of economy, the lower limit is preferably 0.0001%.

[O: 0.0100% or Less]

O (oxygen) is an element contained as an impurity. If the content is large, coarse oxides are formed in the steel and sometimes the bendability and hole expandability are caused to deteriorate. Therefore, the O content is limited to 0.0100% or less. The O content is preferably 0.0080% or less, 0.0060% or less, or 0.0050% or less. The O content may also be 0%, but from the viewpoint of production costs, the lower limit is preferably 0.0001%.

The basic chemical composition of the steel sheet according to embodiments of the present invention and the slab used for producing the same is as explained above. Furthermore, the steel sheet and slab may, as needed, contain the following optional elements. The lower limits of the contents in the case where the optional elements are not contained are 0%.

[Cr: 0 to 1.00%, Mo: 0 to 1.00%, Cu: 0 to 1.00%, Ni: 0 to 1.00%, Co: 0 to 1.00%, W: 0 to 1.00%, Sn: 0 to 1.00%, Sb: 0 to 0.50%, Nb: 0 to 0.200%, V: 0 to 1.00%, and B: 0 to 0.0050%]

Cr (chromium), Mo (molybdenum), Cu (copper), Ni (nickel), Co (cobalt), W (tungsten), Sn (tin), Sb (antimony), Nb (niobium), V (vanadium), and B (boron) are all elements effective for increasing the strength of steel sheet. For this reason, according to need, one or more of these elements may be added. However, if excessively adding these elements, the effect becomes saturated and an increase in cost is invited. Therefore, the contents are Cr: 0 to 1.00%, Mo: 0 to 1.00%, Cu: 0 to 1.00%, Ni: 0 to 1.00%, Co: 0 to 1.00%, W: 0 to 1.00%, Sn: 0 to 1.00%, Sb: 0 to 0.50%, Nb: 0 to 0.200%, V: 0 to 1.00%, and B: 0 to 0.0050%. The elements may also be 0.001% or more, 0.005% or more, or 0.010% or more. In particular, the B content may also be 0.0001% or more or 0.0002% or more. Similarly, the B content may also be 0.0030% or less, 0.0010% or less, less than 0.0005%, 0.0004% or less, or 0.0003% or less.

[Ca: 0 to 0.0100%, Mg: 0 to 0.0100%, Ce: 0 to 0.0150%, Zr: 0 to 0.0100%, La: 0 to 0.0150%, Hf: 0 to 0.0100%, Bi: 0 to 0.0100%, and REM other than Ce and La: 0 to 0.0100%]

Ca (calcium), Mg (magnesium), Ce (cesium), Zr (zirconium), La (lanthanum), Hf (hafnium), and REM other than Ce and La (rare earth elements) are elements contributing to fine dispersion of inclusions in steel, while Bi (bismuth) is an element lightening microsegregation of Mn, Si, and other substitution type alloy elements in steel. These contribute to improvement of the workability of steel sheet, therefore according to need, one or more of these elements may be added. Provided, however, that excessive addition triggers deterioration of ductility. Therefore, the upper limits of the contents are 0.0150% or 0.0100%. Further, the elements may be 0.0001% or more, 0.0005% or more, or 0.0010% or more.

In the steel sheet according to embodiments of the present invention, the balance other than the above elements is comprised of Fe and impurities. The "impurities" are components, etc., entering due to various factors of the production process when industrially producing steel sheet such as the ore and scrap and other such raw materials.

"Steel Microstructure Inside Steel Sheet"

Next, the reasons for limitation of the internal microstructure of steel sheet according to the embodiments of the present invention will be explained.

[Ferrite: 1 to 50%]

Ferrite is excellent in ductility, but is a soft structure. To improve the elongation of steel sheet, the ferrite content is, by vol %, 1% or more. The ferrite content may also be, by vol %, 3% or more, 5% or more, or 10% or more. Provided, however, that, if excessively containing ferrite, the desired steel sheet strength becomes difficult to secure. Therefore, the content is, by vol %, 50% or less and may also be 45% or less, 40% or less, or 35% or less.

[Ratio of Nonrecrystallized Ferrite in Ferrite: 0 to 50%]

By making the ratio of nonrecrystallized ferrite increase, i.e., by reducing the ratio of nonrecrystallized ferrite in the ferrite, the steel microstructure can be made more isotropic, therefore the elongation can be improved plus the hole expandability can be improved. Thus, to obtain excellent elongation and hole expandability, the ratio of nonrecrystallized ferrite in the ferrite is limited to, by vol %, 50% or less. The ratio of nonrecrystallized ferrite in the ferrite may also be, by vol %, 40% or less, 30% or less, or 20% or less. If making this ratio, by vol %, 10% or less, particularly excellent elongation and hole expandability can be obtained. The lower limit is not particularly limited and may also be 0%. For example, the ratio of nonrecrystallized ferrite in the ferrite may be, by vol %, 1% or more, 2% or more, or 3% or more.

[Tempered Martensite: 1% or More]

Tempered martensite is a high strength and tough structure and is an essential metal structure in the embodiments of the present invention. In order to balance the strength and elongation at a high level, the tempered martensite content is, by vol %, 1% or more. The tempered martensite content is preferably 5% or more and may be 10% or more or 20% or more. The upper limit is not particularly prescribed, but for example the tempered martensite content may also be, by vol %, 90% or less, 80% or less, 70% or less, or 50% or less.

[Retained Austenite: 5% or More]

Retained austenite improves the ductility of steel sheet by the TRIP effect of transformation to martensite by work induced transformation during deformation of steel sheet. For this reason, the retained austenite content is, by vol %, 5% or more and may also be 8% or more or 10% or more. The greater the retained austenite, the more the elongation rises, therefore there is no need to prescribe an upper limit value. Provided, however, that to obtain a large amount of retained austenite, a need arises to include C and other alloy elements in large amounts. In the present invention, no upper limit is provided for the C content, therefore obtaining 30% or more retained austenite is de facto difficult. Therefore, the retained austenite content may also be, by vol %, 30% or less, 25% or less, or 20% or less.

[Fresh Martensite: 0 to 10%]

In the embodiments of the present invention, "fresh martensite" means martensite which has not been tempered, i.e., martensite which does not contain carbides. This fresh martensite is a brittle structure, therefore becomes starting points for fracture at the time of plastic deformation and causes the local ductility of the steel sheet to deteriorate. Therefore, the content is, by vol %,
to 10%. The fresh martensite content is preferably, by vol %, 0 to 8% or 0 to 5%. The fresh martensite content may also be, by vol %, 1% or more or 2% or more.

[Total of Pearlite and Cementite: 0 to 5%]

Pearlite contains hard and coarse cementite becomes starting points for fracture at the time of plastic deformation, therefore causes the local ductility of steel sheet to deteriorate. Therefore, the content, together with cementite, is, by vol %, 0 to 5% and may be 0 to 3% or 0 to 2%.

[Bainite: Balance]

The balance of the metal structures according to the embodiments of the present invention is comprised of bainite. The bainite of the balance microstructure may be any of upper bainite having carbides between laths, lower bainite having carbides inside the laths, bainitic ferrite not having carbides, or granular bainitic ferrite where lath boundaries of the bainite have recovered and become unclear or may be mixed structures of the same. The bainite content of the balance may also be 0%. For example, the bainite content of the balance may also be, by vol %, 1% or more, 5% or more, or 10% or more. The upper limit is not particularly prescribed, but for example the bainite content of the balance may also be, by vol %, 70% or less, 60% or less, 50% or less, or 40% or less.

The fractions of the steel structures are evaluated by the SEM-EBSD method (electron backscatter diffraction) and examination of SEM secondary electron images. First, a sample is taken in a cross-section of thickness parallel to the rolling direction of the steel sheet and using the cross-section of thickness at the center position in the width direction as the examined surface. The examined surface is mechanically polished to finish it to a mirror surface, then is electrolytically polished. Next, in one or more fields in the examined surface in a range of ⅛ thickness to ⅜ thickness centered on ¼ thickness from the surface of the steel sheet, an area of a total of $2.0 \times 10^{-9}$ m$^2$ or more is analyzed for crystal structure and orientation by the SEM-EBSD method. For analysis of the data obtained by the EBSD method, "TSL OIM Analysis 6.0" is used. Further, the distance between evaluation points (steps) is 0.03 to 0.20 μm. Regions judged to be FCC iron from the results of examination are deemed retained austenite. Furthermore, a crystal grain map is obtained deeming boundaries with differences in crystal orientation of 15 degrees or more as grain boundaries.

Next, a sample the same as that examined by EBSD is corroded by Nital. The same fields as the EBSD examination are examined by secondary electron images. To examine the same fields as at the time of EBSD measurements, Vickers indentations or other marks may be made in advance. From the obtained secondary electron images, the area fractions of the ferrite, retained austenite, bainite, tempered martensite, fresh martensite, and pearlite are respectively measured and deemed the volume fractions. Regions having lower structures in the particles and having cementite precipitated in several variants are judged as tempered martensite. Regions with cementite precipitated in a lamellar manner are judged as pearlite (or total of pearlite and cementite). Regions with low brightness and no lower structures observed are judged as ferrite. Regions with high brightness and with no lower structures appearing due to etching are judged as fresh martensite and retained austenite. Regions not corresponding to any of these regions are judged as bainite. The volume ratios of these are calculated by the point counting method and defined as the volume ratios of the structures. The volume ratio of fresh martensite can be found by subtracting the volume ratio of retained austenite found by the X-ray diffraction method.

Further, regions with a grain average misorientation (GAM) in the EBSD of more than 0.6 among the crystal grains judged as ferrite are judged as nonrecrystallized ferrite while ones with 0.6 or less crystals are judged as recrystallized ferrite. At this time, the size of the measurement steps is made 0.10 μm and the θ step size at the time of Hough transform of the EBSD pattern is made 1°.

The volume ratio of the retained austenite is measured by the X-ray diffraction method. A surface parallel to the sheet surface is finished to a mirror surface in a range of ⅛ thickness to ⅜ thickness centered on ¼ thickness from the surface of the steel sheet, and the area ratio of FCC iron is measured by the X-ray diffraction method. This is deemed the volume ratio of the retained austenite.

The steel sheet according to embodiments of the present invention may have a plating layer containing zinc at least at one surface of the surfaces, preferably both of the surfaces. The plating layer may be a hot dip galvanized layer or hot dip galvannealed layer having any composition known to persons skilled in the art. In addition to Zn, Al, Mg, or other added elements may be contained. Further, the amount of deposition of the plating layer is not particularly limited and may be a general amount of deposition. The steel sheet according to embodiments of the present invention is naturally not limited to such a plated steel sheet and also includes unplated steel sheet. The reason why is that even with unplated steel sheet, for example, when spot welding it with galvanized steel sheet, zinc melted at the galvanized steel sheet sometimes penetrates the unplated steel sheet and causes LME cracking.

[Area Ratio of Regions with $Al_S/Si_S$ Ratio of 0.2 or Less: 50% or Less]

In the embodiments of the present invention, to improve the LME resistance, when analyzing the surface of steel sheet by an EPMA (electron probe microanalyzer), it is necessary to limit the area ratio of regions with an $Al_S/Si_S$ ratio of 0.2 or less to 50% or less. Here, $Al_S$ is the surface Al concentration (mass %) while $Si_S$ is the surface Si concentration (mass %). If hot dip galvanizing, hot dip galvannealing, etc., conventional steel sheet, sometimes the zinc in the plating layer melted by the heat at the time of welding penetrates into the grain boundaries of the welded part structure to cause LME cracking inside the steel sheet. However, according to embodiments of the present invention, by limiting the area ratio of regions with an $Al_S/Si_S$ ratio of 0.2 or less to 50% or less, it is possible to inhibit penetration of liquid Zn inside of the steel sheet due to the action of the Al concentrated at the steel sheet surface layer and as a result it becomes possible to remarkably improve the LME cracking resistance of the steel sheet. The area ratio of regions with an $Al_S/Si_S$ ratio of 0.2 or less is preferably 30% or less, more preferably 20% or less, most preferably 10% or less. The lower limit is not particularly prescribed and may be 0% as well. For example, the area ratio of regions with an $Al_S/Si_S$ ratio of 0.2 or less may be 1% or more, 2% or more, or 3% or more.

$Al_S$ and $Si_S$ are measured using an EPMA as follows: If the subject is a plated steel sheet, the steel sheet surface is measured after removing the plating by a 5% hydrochloric acid aqueous solution containing an inhibitor. At this time, if Zn of an average 0.2 mass % or more is detected by EPMA measurement, it is judged that the plating has been insufficiently removed and the sample is prepared and EPMA measurement performed again. Using a measurement area of 30 mm×30 mm and measurement intervals of 30 μm, the mass % of Al and Si at the different measurement points (beam diameter: 30 μm) are acquired and the $Al_S/Si_S$ of the measurement points are calculated. The number of measurement points with a value of 0.2 or less is calculated and divided by the total number of measurement points to determine the area ratio of regions with an $Al_S/Si_S$ ratio of 0.2 or less.

[Mechanical Properties]

According to the steel sheet according to embodiments of the present invention, it is possible to achieve excellent mechanical properties, for example, high strength, specifically 980 MPa or more tensile strength (TS). The tensile strength is preferably 1080 MPa or more, more preferably is 1180 MPa or more. The upper limit is not particularly prescribed, but, for example, the tensile strength may be 1500 MPa or less, 1400 MPa or less, 1300 MPa or less, or 1250 MPa or less. According to the steel sheet according to embodiments of the present invention, similarly, it is possible to achieve a high ductility, more specifically, it is possible to achieve a total elongation of 10.0% or more, preferably 12.0% or more, more preferably 15.0% or more or 20.0% or more (El). The upper limit is not particularly prescribed, but, for example, the total elongation may be 40.0% or less or 30.0% or less. The tensile strength and total elongation are measured by taking a JIS No. 5 tensile test piece from a direction perpendicular to the rolling direction of the steel sheet and performing a tensile test based on JIS Z2241: 2011. Further, according to the steel sheet according to embodiments of the present invention, it is possible to achieve a high hole expandability, more specifically achieve a 20% or more, preferably 25% or more, more preferably 30% or more hole expansion ratio (λ). The upper limit is not particularly prescribed, but, for example, the hole expansion ratio may be 80% or less or 70% or less. The hole expansion ratio is measured by performing a "JFS T 1001 hole expansion test" of the Japan Iron and Steel Federation. According to the steel sheet according to embodiments of the present invention, the balance of the tensile strength (TS), total elongation (El), and hole expansion ratio (λ) can be improved at a high level, therefore it is possible to achieve a press-formability preferable for use as an automobile member.

[Sheet Thickness]

The steel sheet according to embodiments of the present invention has a thickness of for example 1.0 to 6.0 mm. While not particularly limited, the sheet thickness may also be 1.2 mm or more, 1.6 mm or more, or 2.0 mm or more. Similarly, the sheet thickness may be 5.0 mm or less, 4.0 mm or less, or 3.0 mm or less.

<Production Method>

Next, the method for producing the steel sheet will be explained. The following explanation is intended to illustrate the characteristic method for producing the steel sheet according to embodiments of the present invention and is not intended to limit the steel sheet to one produced by the production method of production such as explained below.

"(A) Hot Rolling Step"

First, in the hot rolling step, a slab having the same chemical composition as the chemical composition explained above regarding the steel sheet is heated before hot rolling, then subjected to rough rolling and finish rolling. The heating temperature of the slab is not particularly limited, but for sufficiently melting the borides and carbides, etc., in general it is 1150° C. or more. The steel slab used is preferably one cast by the continuous casting method from the viewpoint of productivity, but may also be produced by the ingot-making method or thin slab casting method.

[Rough Rolling]

In the present method, the heated slab is rough rolled at a steel sheet temperature of 1050 to 1200° C. and a rolling reduction per pass of more than 20% at least 2 times, preferably at least 3 times. Due to this, strain induced precipitation of AlN is promoted in the rough rolling. If the rough rolling conditions do not satisfy the above ranges, the strain induced precipitation of AlN in the rough rolling becomes insufficient and AlN precipitates in the later finish rolling. The AlN precipitating in the finish rolling is finer and larger in number density than the AlN precipitating in the rough rolling. Such AlN inhibits recrystallization at the time of cold rolling and annealing due to its pinning effect. As a result, the ratio of nonrecrystallized ferrite in the ferrite becomes higher and there is a possibility that sufficient elongation and hole expandability will not be able to be achieved in the finally obtained steel sheet. Rough rolling is higher in temperature compared with finish rolling, therefore by performing rolling with a relatively high load in the rough rolling, it is possible to promote precipitation of coarse AlN and as a result it is possible to inhibit the precipitation of fine and large number density AlN in the subsequent lower temperature finish rolling. The rough rolling may be performed by the tandem system using a plurality of rolling stands or may be performed by the reverse mill system of going back and forth through a single rolling stand.

[Finish Rolling]

Finish rolling, for example, can be performed by the tandem system using a plurality of rolling stands. The finish rolling conditions do not particularly have to be limited, but, or example, it is sufficient to perform the finish rolling within a range where the finish rolling entry temperature satisfies 950 to 1100° C., the finish rolling exit temperature satisfies 850° C. to 1000° C., and the total rolling reduction satisfies 80 to 95% as conditions. If the finish rolling entry temperature is more than 1100° C., the finish rolling exit temperature is more than 1000° C., or the total rolling reduction falls below 80%, in some cases, the crystal grain size of the hot rolled steel sheet will become coarser and coarsening of the final product sheet structure can be triggered. On the other hand, if the finish rolling entry temperature falls below 950° C., the finish rolling exit temperature falls below 850° C., or the total rolling reduction rises above 95%, the hot rolled steel sheet develops texture, therefore there is a possibility of the anisotropy in the final product sheet manifesting itself

[Descaling]

Descaling is performed at least one time in the rough rolling and finish rolling, more specifically right after a specific rolling pass during the rough rolling and right after a specific rolling pass in the finish rolling. In the rough rolling, high water pressure descaling satisfying a pressure: 10 MPa or more, a distance between the steel sheet and nozzle tip: 500 mm or less, and angle formed by orientation of nozzle and thickness direction of steel sheet: 3 to 15 degrees is performed at a steel sheet temperature of 1050 to 1200° C. at least one time within 10 seconds after passing through a rolling pass with a rolling reduction of more than 20%. The upper limit of the pressure of the descaling in the rough rolling is not particularly prescribed, for example, may be 20 MPa or less. Similarly, in the finish rolling, high water pressure descaling satisfying a pressure: 2 MPa or more, a distance between the steel sheet and nozzle tip: 400 mm or less, and angle formed by orientation of nozzle and thickness direction of steel sheet: 3 to 15 degrees is performed at a steel sheet temperature of 950 to 1100° C. at least one time within 3.0 seconds after passing through a rolling pass with a rolling reduction of more than 30%. The upper limit of the pressure of the descaling in the finish rolling is not particularly prescribed, for example, may be 20 MPa or less or less than 10 MPa. If not performing descaling satisfying the above conditions, the Si not able to be dissolved in the scale is discharged from the scale along with the growth of the scale and excessively concentrates at the steel sheet surface layer. As a result, the surface Si concentration $Si_S$ increases, the regions with a low $Al_S/Si_S$ ratio of the ratio with the surface Al concentration $Al_S$ become more numerous, and the area ratio of regions with an $Al_S/Si_S$ ratio of 0.2 or less becomes outside the desired range. To decrease or inhibit such concentration of Si at the steel sheet surface layer, it is particularly important to perform the descaling at as early a stage as possible after passing through the rolling passes at both the rough rolling and finish rolling.

[Elapsed Time after Final Descaling and Until Steel Sheet Reaches 700° C.]

After the final descaling ends, the steel sheet is cooled so as to satisfy the following formula (2). If the value of formula (2) rises above 0.30, the scale will excessively regrow and the Si discharged from the scale will again concentrate at the steel sheet surface layer. As a result, the $Si_S$ increases, the regions with a low $Al_S/Si_S$ ratio become more numerous, and the area ratio of regions with an $Al_S/Si_S$ ratio of 0.2 or less becomes outside the desired range. On the other hand, if falling below 0.03, the concentration of Al at the surface layer becomes insufficient, therefore again the area ratio of regions with an $Al_S/Si_S$ ratio of 0.2 or less becomes outside the desired range.

[Formula 2]

$$0.03 \leq \sum_{t}^{t_f} 10^3 \cdot \sqrt{0.000631 \cdot \exp\left[-\frac{169{,}000}{8.314 \cdot \{T(t) + 273\}}\right]} \cdot \Delta t \leq 0.30 \quad (2)$$

t: elapsed time (s) from end of final descaling
T (t): steel sheet temperature (° C.) at elapsed time "t"
tf: elapsed time (s) after end of final descaling until steel sheet reaches 700° C.

[Coiling Temperature]

The finish rolled hot rolled steel sheet is, for example, cooled to 700° C. or less, then taken up in a coil. The coiling temperature does not particularly have to be limited, but 450 to 680° C. is desirable. If the coiling temperature falls below 450° C., the hot rolled sheet becomes excessively large in strength and sometimes the cold rollability is impaired. On the other hand, if the coiling temperature rises above 680° C., the Mn and other alloy elements concentrate at the cementite, therefore in the final annealing step, sometimes dissolution of the cementite is delayed and a drop in strength is triggered. The lower limit of the coiling temperature may also be 500° C. Similarly, the upper limit of the coiling temperature may be 650° C. or 600° C.

"(B) Pickling Step"

The hot rolled steel sheet obtained in the hot rolling step is pickled for 30 seconds or more by running it through a temperature 70 to 90° C. aqueous solution containing 1.0 to 5.0 mol/L of HCl and less than 3.0 mol/L of $Fe^{2+}$ by an average speed if 10 m/min or more. At this time, to efficiently remove the Si concentrated layer formed at the interface of the scale and ground iron, before pickling, the hot rolled steel sheet is subjected to at least one bending/unbending deformation. If the HCl concentration in the pickling solution falls below 1.0 mol/L, if the $Fe^{2+}$ concentration becomes 3.0 mol/L or more, if the temperature of the aqueous solution falls below if the average speed of the hot rolled steel sheet falls below 10 m/min, or if the pickling time falls below 30 seconds, the pickling will not sufficiently proceed and the Si concentrated layer at the interface of the scale and ground iron will not be able to be sufficiently removed, therefore the regions of the steel sheet surface with a small $Al_S/Si_S$ ratio will become more numerous and the area ratio of the regions with an $Al_S/Si_S$ ratio of 0.2 or less will rise above the desired range. In particular, it is believed that if the $Fe^{2+}$ concentration in the aqueous solution is high, the chemical reaction between the scale and HCl will be impaired. On the other hand, if the HCl concentration rises above 5.0 mol/L or the temperature rises above 90° C., the pickling will excessively proceed and the surface quality of the steel sheet will sometimes fall.

"(C) Cold Rolling Step"

The pickled hot rolled steel sheet is next cold rolled. The rolling reduction of the cold rolling is 30% or more so as to promote recrystallization. The rolling reduction may also be 40% or more. On the other hand, excessive reduction requires an extra large rolling pressure and invites an increase in load of the cold rolling mill, therefore the upper limit is 75% or 70%.

"(D) Heat Treatment Step"
[Heat Treatment: Average Heating Speed Between 650 to Ac1° C. of 1.0 to 5.0° C./s]

Next, the obtained cold rolled steel sheet is sent to predetermined heat treatment at the heat treatment step. To promote recrystallization of the ferrite, the average heating speed is 5.0° C./s or less. On the other hand, if falling below 1.0° C./s, the productivity is inhibited. Therefore, the average heating speed between 650 to Ac1 is limited to 1.0 to 5.0° C./s. The Ac1 (° C.) is calculated by the following formula: The mass % of the elements are entered for the element symbols in the following formula. For elements not contained, 0 mass % is entered.

$$Ac1(° C.)=723-10.7\times Mn-16.9\times Ni+29.1\times Si+16.9\times Cr$$

[Soaking: Holding at Ac1+30 to 950° C. Peak Heating Temperature for 1 to 500 Seconds]

To make austenite transformation sufficiently proceed and obtain the desired microstructure at the later cooling, the steel sheet is heated to at least Ac1+30° C. or more and soaked at the temperature (peak heating temperature). If the austenite transformation is not sufficient, in the final microstructure, sometimes ferrite is greatly produced. Provided, however, that if excessively raising the heating temperature, not only is deterioration of the toughness invited due to coarsening of the austenite grain sizes, but also damage to the annealing facilities is led to. For this reason, the upper limit is 950° C., preferably 900° C. If the soaking time is short, austenite transformation does not sufficiently proceed, therefore it is at least 1 second or more. The soaking time is preferably 30 seconds or more or 60 seconds or more. On the other hand, if the soaking time is too long, the productivity is impaired, therefore the upper limit is 500 seconds, preferably 300 seconds. During the soaking, the steel sheet does not necessarily have to be held at a constant temperature and may fluctuate in a range satisfying the above conditions.

[First Cooling: Average Cooling Speed in 550 to 650° C. Temperature Range of 10 to 100° C./s]

Next, the soaked cold rolled steel sheet is cooled so that the average cooling speed in the 550 to 650° C. temperature range becomes 10 to 100° C./s (first cooling). If the average cooling speed falls below 10° C./s, sometimes the desired ferrite fraction cannot be obtained. The average cooling speed may also be 15° C./s or more or 20° C./s or more. Further, the average cooling speed may also be 80° C./s or less or 60° C./s or less.

[Second Cooling: Stop Cooling Between Ms-150 to Ms° C.]

To make part of the untransformed austenite transform to martensite, the steel sheet is cooled down to the martensite transformation start temperature (Ms)-150 to Ms° C. in range (second cooling). The martensite formed here is tempered by the later reheating and holding and becomes tempered martensite. If the cooling stop temperature exceeds Ms° C., tempered martensite is not formed, therefore the desired metal microstructure is not obtained. On the other hand, if the cooling stop temperature falls below Ms-150° C., the untransformed austenite is excessively reduced, therefore the desired retained austenite content is not obtained. The preferable range of the cooling stop temperature is Ms-120 to Ms-20° C., more preferably is -100° C. to Ms-40° C.

This second cooling may be performed consecutively after the first cooling. It also may not be consecutively after it. For example, it is also possible to stop the cooling at a higher temperature than the Ms after the first cooling, perform the hot dip galvanization, then perform the second cooling.

Martensite transformation occurs after ferrite transformation and/or bainite transformation. Along with the above transformation, C becomes distributed in the austenite. For this reason, this does not match with the Ms at the time of heating to the austenite single phase and rapidly cooling. The Ms at embodiments of the present invention is found by measuring the thermal expansion temperature. For example, the Ms can be found by using a ForceMaster test machine or other apparatus able to measure the amount of thermal expansion during continuous heat treatment, reproducing the heat cycle from the start of heat treatment (room temperature equivalent) to cooling to the Ms or less, and measuring the amount of heat expansion during the same. In a temperature-heat expansion curve at the time of mimicking the heat cycle at the heat expansion measurement apparatus, the steel sheet linearly shrinks in the second cooling, but the linear relationship is departed from at a certain temperature. The temperature at that time is the Ms in embodiments of the present invention.

[Low Temperature Holding: Heating Cooled Cold Rolled Steel Sheet after Second Cooling to Temperature Region of 330 to 450° C., then Holding it at the Temperature Range for 50 to 1000 Seconds]

After the second cooling, the steel sheet is reheated to 330° C. to 450° C. in range and held there. To obtain the desired retained austenite content by this treatment, the carbon is made to concentrate in the austenite to make the austenite stabler (austempering) and simultaneously the martensite formed by the second cooling is tempered. If the holding temperature is less than 330° C. or the holding time is less than 50 seconds, carbon is insufficiently concentrated at the austenite and obtaining the desired retained austenite content becomes difficult. On the other hand, if the holding temperature exceeds 450° C. or the holding time exceeds 1000 seconds, the austenite breaks down into cementite, therefore again the desired retained austenite content is not obtained.

[Hot Dip Galvanization]

If producing hot dip galvanized steel sheet, after the first cooling the steel sheet is dipped in a hot dip galvanization bath. It may be dipped in the plating bath between the first cooling and the second cooling, may be dipped in it between the second cooling and low temperature holding, or may be dipped in it after the low temperature holding. Alternatively, the steel sheet may be cooled down to room temperature, the heat treatment step ended once, then the plating be performed at another line. Even if performing the plating at any timing of after the first cooling (between the first cooling and the second cooling), after the second cooling (between the second cooling and low temperature holding), after the low temperature holding, and after the heat treatment step, there is no effect on the finally obtained steel microstructure and steel sheet having a steel microstructure the same as non-plated cold rolled steel sheet can be obtained. Regarding the steel sheet temperature at the time of dipping the steel sheet in the hot dip galvanization bath, the effect on the steel sheet performance is small, but if the difference between the steel sheet temperature and the plating bath temperature is too large, sometimes the plating bath temperature changes and operations are obstructed. For this reason, heating and cooling are desirably performed so that the steel sheet temperature becomes the plating bath temperature minus 20° C. to the plating bath temperature plus 20° C. The hot dip galvanization may be performed by the usual method. For example, the plating bath temperature may be 440 to 470° C. and the dipping time may be 5 seconds or less. The plating bath is preferably a plating bath containing Al in 0.08 to 0.2%, but it may also contain, as impurities, Fe, Si, Mg, Mn, Cr, Ti, and Pb. Further, the amount of deposition of the plating is preferably controlled by gas wiping or another known method. The amount of deposition is preferably 25 to 75 g/m² per surface.

[Alloying]

The hot dip galvanized steel sheet formed with the hot dip galvanized layer may be alloyed in accordance with need. In that case, if the alloying temperature is less than 460° C., the alloying speed becomes slower and the productivity is impaired. Not only that, uneven alloying occurs. Therefore, the alloying temperature is desirably 460° C. or more. On the other hand, if the alloying temperature exceeds 600° C., sometimes the alloying excessively proceeds and the plating adhesion of the steel sheet deteriorates. For this reason, the alloying temperature is desirably 600° C. or less.

Finally, the steel sheet is cooled down to room temperature to obtain the final product. The steel sheet may also be temper rolled to flatten the surface and adjust the surface roughness. In this case, to avoid deterioration of the ductility, the elongation rate is preferably 2% or less.

EXAMPLES

Next, examples of the present invention will be explained. The conditions in the examples are just illustrations for confirming the workability and effects of the present invention. The present invention is not limited to these illustrations. In the present invention, various conditions can be employed so long as not departing from the gist of the present invention and achieving the object of the present invention.

Steels having the chemical compositions shown in Table 1 were cast to prepare slabs. The balances other than the components shown in Table 1 were Fe and impurities. These slabs were hot rolled, including rough rolling and finish rolling, by the tandem system comprised of a plurality of rolling stands under the conditions shown in Tables 2 and 4 to produce hot rolled steel sheets. The descaling in the rough rolling was performed at least one time under the conditions of a pressure: 15 MPa, distance between steel sheet and nozzle tip: 400 mm, and angle formed by orientation of nozzle and thickness direction of steel sheet: 15 degrees. Similarly, the descaling in the finish rolling was performed at least one time under the conditions of a pressure: 3 MPa, distance between steel sheet and nozzle tip: 300 mm, and angle formed by orientation of nozzle and thickness direction of steel sheet: 10 degrees. After that, the sheets were cooled and coiled under the conditions shown in Table 2. Next, at least one bending/unbending deformation was given by a tension leveler, then the hot rolled steel sheets were pickled and scale on the surfaces was removed. After that, the sheets were cold rolled. The thicknesses after cold rolling were in all case made 1.6 mm. Furthermore, the obtained steel sheets were heat treated under the conditions shown in Table 2 for the cold rolled steel sheets and under the conditions shown in Table 4 for the hot dip galvanized steel sheets. The hot dip galvanization was performed between the first cooling and second cooling in the heat treatment step. Alloying was performed in accordance with need. In Tables 2 to 5, "CR" indicates cold rolled steel sheet which is not hot dip galvanized, "GI" indicates steel sheet which is hot dip galvanized, and "GA" shows steel sheet which is hot dip galvannealed.

From each of the thus obtained steel sheets, a JIS No. 5 tensile test piece was taken from a direction perpendicular to the rolling direction and subjected to a tensile test based on JIS Z2241: 2011 to measure the tensile strength (TS) and total elongation (El). Further, a "JFS T 1001 hole expansion test" of the Japan Iron and Steel Federation was performed to measure the hole expansion ratio ($\lambda$). A sample with a TS of 980 MPa or more and a TS×El×$\lambda^{0.5}$/1000 of 90 or more was good in mechanical properties and judged to have press-formability preferable for use as an automobile member.

Further, to evaluate the liquid metal embrittlement (LME) cracking resistance of spot welded parts, sets of two test pieces of 150 mm width×50 mm length were taken and subjected to spot welding tests. The sets of sheets were made the steel sheets shown in Tables 3 and 5 and commercially available 270 MPa class hot dip galvannealed steel sheets. These were welded in states given weld angles of 3°. For the test machine, a servo motor driven stationary type spot welding test machine was used. The power source was made a single phase AC 50 Hz, the pressing force was made 400 kgf, the weld time was made 20 cycles, and the holding was made 5 cycles. The weld current value was made a current value giving a weld nugget diameter of four times √t (t: sheet thickness/mm). For the electrodes, electrodes made of chrome copper of a tip diameter φ6 mm and tip radius of curvature R40 mm were used. The welded samples were examined for cross-section of the nugget. Those with 0.1 mm or more cracks observed were judged as "poor" and others as "good". The results are shown in Table 3 and Table 5.

TABLE 1

| Steel type | Chemical composition (mass %, balance: Fe and impurities) | | | | | | | | | | | | | |
|---|---|---|---|---|---|---|---|---|---|---|---|---|---|---|
| | C | Si | Mn | P | S | Al | Ti | N | O | Cr | Mo | Cu | Ni | Co |
| A | 0.21 | 0.81 | 2.46 | 0.007 | 0.0012 | 0.70 | 0.014 | 0.0031 | 0.0008 | — | — | — | — | — |
| B | 0.29 | 0.33 | 2.14 | 0.009 | 0.0015 | 1.36 | 0.058 | 0.0036 | 0.0012 | — | — | — | — | — |
| C | 0.15 | 1.40 | 2.38 | 0.010 | 0.0007 | 0.33 | 0.020 | 0.0027 | 0.0006 | — | — | — | — | — |
| D | 0.20 | 0.99 | 1.92 | 0.008 | 0.0044 | 0.46 | 0.025 | 0.0042 | 0.0010 | — | — | — | — | — |
| E | 0.22 | 0.64 | 2.41 | 0.011 | 0.0020 | 0.90 | 0.003 | 0.0020 | 0.0005 | — | — | — | — | — |
| F | 0.25 | 1.02 | 1.45 | 0.006 | 0.0026 | 0.62 | 0.018 | 0.0030 | 0.0018 | — | — | — | 0.23 | — |
| G | 0.17 | 0.65 | 2.32 | 0.015 | 0.0004 | 1.13 | 0.092 | 0.0020 | 0.0015 | — | 0.06 | — | — | — |
| H | 0.19 | 0.88 | 2.16 | 0.012 | 0.0033 | 0.60 | 0.015 | 0.0026 | 0.0022 | 0.28 | — | — | — | — |
| I | 0.23 | 0.71 | 2.80 | 0.023 | 0.0010 | 0.77 | 0.006 | 0.0014 | 0.0007 | — | — | — | — | — |
| J | 0.22 | 0.75 | 2.44 | 0.011 | 0.0021 | 0.55 | 0.018 | 0.0035 | 0.0005 | — | 0.25 | — | — | — |
| K | 0.18 | 0.56 | 2.55 | 0.005 | 0.0008 | 0.41 | 0.015 | 0.0040 | 0.0010 | 0.70 | — | 0.19 | 0.10 | — |
| L | 0.16 | 0.78 | 3.43 | 0.013 | 0.0013 | 1.01 | 0.012 | 0.0021 | 0.0009 | — | — | — | — | — |
| M | 0.20 | 0.47 | 2.59 | 0.010 | 0.0009 | 0.34 | 0.030 | 0.0033 | 0.0011 | — | — | — | — | 0.23 |
| N | 0.21 | 0.80 | 2.66 | 0.012 | 0.0018 | 0.68 | 0.019 | 0.0037 | 0.0014 | — | — | — | — | — |
| O | 0.22 | 0.65 | 2.54 | 0.020 | 0.0016 | 0.42 | 0.012 | 0.0030 | 0.0004 | — | — | — | — | — |

TABLE 1-continued

| | | | | | | | | | | | | | | |
|---|---|---|---|---|---|---|---|---|---|---|---|---|---|---|
| P | 0.17 | 1.13 | 3.06 | 0.017 | 0.0005 | 0.95 | 0.010 | 0.0026 | 0.0013 | — | — | — | — | — |
| Q | 0.20 | 1.20 | 2.51 | 0.010 | 0.0023 | 0.16 | 0.020 | 0.0038 | 0.0009 | — | — | — | — | — |
| R | 0.23 | 1.77 | 2.59 | 0.009 | 0.0009 | 0.52 | 0.022 | 0.0032 | 0.0010 | — | — | — | — | — |
| S | 0.19 | 0.88 | 2.05 | 0.014 | 0.0015 | 1.67 | 0.020 | 0.0024 | 0.0003 | — | — | — | — | — |
| T | 0.19 | 0.20 | 2.61 | 0.013 | 0.0006 | 0.56 | 0.017 | 0.0031 | 0.0020 | — | — | — | — | — |
| U | 0.13 | 0.85 | 2.89 | 0.005 | 0.0040 | 0.72 | 0.013 | 0.0026 | 0.0015 | — | — | — | — | — |
| V | 0.33 | 0.80 | 2.15 | 0.007 | 0.0020 | 0.89 | 0.011 | 0.0020 | 0.0009 | — | — | — | — | — |
| W | 0.21 | 0.87 | 1.30 | 0.015 | 0.0014 | 0.51 | 0.022 | 0.0050 | 0.0017 | — | — | — | — | — |
| X | 0.20 | 0.69 | 3.68 | 0.013 | 0.0017 | 0.98 | 0.014 | 0.0036 | 0.0007 | — | — | — | — | — |
| Y | 0.22 | 1.02 | 2.40 | 0.018 | 0.0021 | 0.53 | 0.000 | 0.0027 | 0.0020 | — | — | — | — | — |
| Z | 0.20 | 0.90 | 2.16 | 0.010 | 0.0015 | 0.65 | 0.120 | 0.0036 | 0.0012 | — | — | — | — | — |

| Steel type | Chemical composition (mass %, balance: Fe and impurities) | | | | | | Left side of formula (1) | Ac1 |
|---|---|---|---|---|---|---|---|---|
| | W | Sn | Sb | Nb | V | B | Others | | |
| A | — | — | — | — | — | — | — | 0.0010 | 720 |
| B | — | — | — | — | — | — | — | 0.0134 | 710 |
| C | — | — | — | — | — | 0.0016 | — | 0.0032 | 738 |
| D | — | — | — | 0.012 | 0.27 | 0.0005 | — | 0.0031 | 731 |
| E | — | — | — | — | — | — | — | 0.0011 | 716 |
| F | — | 0.27 | — | — | — | — | — | 0.0023 | 733 |
| G | — | — | — | — | — | — | La: 0.0150 Hf: 0.0069 | 0.0249 | 717 |
| H | — | — | — | — | — | — | Bi: 0.0054 | 0.0018 | 730 |
| I | — | — | 0.13 | — | — | 0.0010 | — | 0.0004 | 714 |
| J | — | — | — | — | — | 0.0022 | — | 0.0018 | 719 |
| K | — | — | — | — | — | — | — | 0.0004 | 722 |
| L | — | — | — | 0.020 | — | — | — | 0.0014 | 709 |
| M | 0.36 | — | — | — | — | 0.0038 | — | 0.0055 | 709 |
| N | — | — | — | — | — | 0.0019 | Ca: 0.0029 Mg: 0.0045 | 0.0019 | 718 |
| O | — | — | — | — | — | 0.0007 | Ce: 0.0120 Zr: 0.0084 | 0.0005 | 715 |
| P | — | — | — | — | 0.45 | — | REM: 0.0100 | 0.0003 | 723 |
| Q | — | — | — | — | — | — | — | 0.0021 | 731 |
| R | — | — | — | — | — | — | — | 0.0032 | 747 |
| S | — | — | — | — | — | — | — | 0.0035 | 727 |
| T | — | — | — | — | — | — | — | 0.0019 | 701 |
| U | — | — | — | — | — | — | — | 0.0012 | 717 |
| V | — | — | — | — | — | — | — | 0.0012 | 723 |
| W | — | — | — | — | — | — | — | 0.0014 | 734 |
| X | — | — | — | — | — | — | — | 0.0005 | 704 |
| Y | — | — | — | — | — | — | — | 0.0027 | 727 |
| Z | — | — | — | — | — | — | — | 0.0315 | 726 |

Underlines show outside scope of present invention.

"—" in table shows corresponding chemical constituent not intentionally added.

TABLE 2

| | | Hot rolling step | | | | | | | |
|---|---|---|---|---|---|---|---|---|---|
| | | Rough rolling | | Descaling | | | Finish rolling | | |
| No. | Steel type | Slab heating temp. ° C. | No. of rolling passes at steel sheet temp. 1050 to 1200° C. and rolling reduction more than 20% X | Rolling reduction of rolling pass right before % | Time until performance after passing through rolling pass s | Steel sheet temp. of rolling pass right before ° C. | Finish rolling entry temp. ° C. | Finish rolling exit temp. ° C. | Finish rolling total rolling reduction % |
| 1 | A | 1240 | 4 | 30 | 4 | 1150 | 1060 | 930 | 91 |
| 2 | A | 1240 | 4 | 30 | 4 | 1150 | 1060 | 930 | 91 |
| 3 | A | 1240 | 4 | 30 | 4 | 1150 | 1060 | 930 | 91 |
| 4 | A | 1240 | 4 | 30 | 4 | 1150 | 1020 | 880 | 91 |
| 5 | A | 1240 | 4 | 30 | 4 | 1150 | 1060 | 930 | 91 |
| 6 | A | 1240 | 4 | 10 | 4 | 1150 | 1060 | 930 | 91 |
| 7 | A | 1240 | 4 | 30 | 30 | 1150 | 1060 | 930 | 91 |
| 8 | A | 1240 | 4 | 30 | 4 | 1010 | 1060 | 930 | 91 |
| 9 | A | 1240 | 1 | 30 | 4 | 1150 | 1060 | 930 | 91 |
| 10 | A | 1280 | 4 | 30 | 4 | 1240 | 1060 | 930 | 91 |

TABLE 2-continued

| No. | Steel type | | | | | | | | |
|---|---|---|---|---|---|---|---|---|---|
| 11 | A | 1260 | 4 | 30 | 4 | 1180 | 1150 | 1020 | 91 |
| 12 | A | 1280 | 4 | 30 | 4 | 1120 | 1040 | 930 | 91 |
| 13 | A | 1280 | 4 | 30 | 4 | 1100 | 1020 | 930 | 91 |
| 14 | A | 1280 | 4 | 30 | 4 | 1150 | 1080 | 970 | 91 |
| 15 | A | 1250 | 4 | 30 | 4 | 1110 | 1040 | 910 | 91 |
| 16 | A | 1220 | 4 | 30 | 4 | 1110 | 1020 | 910 | 91 |
| 17 | A | 1240 | 4 | 30 | 4 | 1100 | 1010 | 880 | 91 |
| 18 | A | 1260 | 4 | 30 | 4 | 1150 | 1080 | 990 | 91 |
| 19 | A | 1240 | 4 | 30 | 4 | 1100 | 1030 | 920 | 91 |
| 20 | A | 1260 | 4 | 30 | 4 | 1150 | 1060 | 970 | 91 |
| 21 | A | 1270 | 4 | 30 | 4 | 1150 | 1090 | 1000 | 91 |
| 22 | A | 1280 | 4 | 30 | 4 | 1140 | 1060 | 930 | 91 |
| 23 | A | 1280 | 4 | 40 | 4 | 1100 | 1040 | 940 | 91 |
| 24 | B | 1260 | 5 | 27 | 5 | 1120 | 1040 | 910 | 91 |
| 25 | C | 1280 | 5 | 34 | 8 | 1110 | 1020 | 900 | 91 |
| 26 | D | 1230 | 4 | 36 | 3 | 1130 | 1060 | 960 | 91 |
| 27 | E | 1220 | 4 | 28 | 3 | 1160 | 1060 | 950 | 91 |
| 28 | F | 1270 | 5 | 28 | 5 | 1140 | 1070 | 970 | 91 |
| 29 | G | 1270 | 4 | 34 | 6 | 1150 | 1090 | 980 | 91 |
| 30 | H | 1220 | 2 | 35 | 9 | 1110 | 1020 | 900 | 91 |
| 31 | I | 1240 | 6 | 32 | 5 | 1100 | 1040 | 920 | 91 |
| 32 | I | 1230 | 5 | 33 | 5 | 1150 | 1080 | 950 | 91 |
| 33 | J | 1270 | 4 | 31 | 5 | 1140 | 1040 | 940 | 91 |
| 34 | K | 1270 | 4 | 38 | 4 | 1170 | 1100 | 1000 | 91 |
| 35 | L | 1240 | 4 | 39 | 5 | 1160 | 1080 | 950 | 91 |
| 36 | M | 1240 | 5 | 33 | 3 | 1130 | 1050 | 930 | 91 |
| 37 | N | 1220 | 5 | 30 | 5 | 1140 | 1080 | 980 | 91 |
| 38 | O | 1230 | 5 | 28 | 5 | 1160 | 1080 | 960 | 91 |
| 39 | P | 1240 | 4 | 28 | 6 | 1140 | 1070 | 950 | 91 |
| 40 | Q | 1240 | 4 | 39 | 5 | 1170 | 1080 | 990 | 91 |
| 41 | R̲ | 1240 | 4 | 36 | 5 | 1140 | 1060 | 970 | 91 |
| 42 | S̲ | 1230 | 4 | 33 | 4 | 1140 | 1050 | 920 | 91 |
| 43 | T̲ | 1220 | 4 | 33 | 5 | 1140 | 1050 | 940 | 91 |
| 44 | U̲ | 1220 | 4 | 33 | 4 | 1140 | 1050 | 940 | 91 |
| 45 | V̲ | 1250 | 4 | 28 | 4 | 1120 | 1040 | 930 | 91 |
| 46 | W̲ | 1230 | 4 | 39 | 4 | 1150 | 1090 | 980 | 91 |
| 47 | X̲ | 1260 | 4 | 38 | 5 | 1140 | 1040 | 910 | 91 |
| 48 | Y̲ | 1220 | 4 | 36 | 5 | 1110 | 1030 | 900 | 91 |
| 49 | Z̲ | 1270 | 4 | 37 | 5 | 1170 | 1090 | 970 | 91 |

| | | Hot rolling step | | | | |
|---|---|---|---|---|---|---|
| | | Finish rolling Descaling | | | | |
| No. | Steel type | Rolling reduction of rolling pass right before % | Time until performance after passing through rolling pass s | Steel sheet temp. of rolling pass right before ° C. | Formula (2) | Coiling temp. ° C. |
| 1 | A | 42 | 1.2 | 1020 | 0.11 | 550 |
| 2 | A | 40 | 10.0 | 1000 | 0.10 | 560 |
| 3 | A | 10 | 1.2 | 1010 | 0.10 | 520 |
| 4 | A | 43 | 1.2 | 900 | 0.10 | 530 |
| 5 | A | 42 | 1.2 | 1020 | 0.01 | 550 |
| 6 | A | 42 | 1.2 | 1020 | 0.11 | 550 |
| 7 | A | 42 | 1.2 | 1020 | 0.11 | 550 |
| 8 | A | 42 | 1.2 | 1020 | 0.11 | 550 |
| 9 | A | 42 | 1.2 | 1020 | 0.11 | 550 |
| 10 | A | 42 | 1.2 | 1020 | 0.11 | 550 |
| 11 | A | 42 | 1.2 | 1130 | 0.11 | 550 |
| 12 | A | 42 | 1.2 | 1010 | 0.53 | 650 |
| 13 | A | 42 | 1.2 | 990 | 0.11 | 550 |
| 14 | A | 42 | 1.2 | 1070 | 0.11 | 550 |
| 15 | A | 42 | 1.2 | 1010 | 0.11 | 550 |
| 16 | A | 42 | 1.2 | 1010 | 0.11 | 550 |
| 17 | A | 42 | 1.2 | 990 | 0.11 | 550 |
| 18 | A | 42 | 1.2 | 1060 | 0.11 | 550 |
| 19 | A | 42 | 1.2 | 1020 | 0.11 | 550 |
| 20 | A | 42 | 1.2 | 1030 | 0.11 | 550 |
| 21 | A | 42 | 1.2 | 1060 | 0.11 | 550 |
| 22 | A | 42 | 1.2 | 1030 | 0.11 | 550 |
| 23 | A | 42 | 1.2 | 1020 | 0.11 | 550 |
| 24 | B | 39 | 2.5 | 1030 | 0.15 | 620 |
| 25 | C | 39 | 1.2 | 1010 | 0.26 | 470 |
| 26 | D | 35 | 1.0 | 1030 | 0.10 | 600 |
| 27 | E | 44 | 1.0 | 1040 | 0.13 | 590 |
| 28 | F | 42 | 0.5 | 1060 | 0.13 | 560 |

TABLE 2-continued

|  |  |  |  |  |  |  |  |
|---|---|---|---|---|---|---|---|
| 29 | G | 41 | 1.0 | 1060 | 0.13 | 600 |
| 30 | H | 35 | 1.1 | 1000 | 0.08 | 580 |
| 31 | I | 39 | 1.1 | 1010 | 0.13 | 610 |
| 32 | I | 36 | 1.1 | 1040 | 0.10 | 590 |
| 33 | J | 35 | 0.9 | 1030 | 0.12 | 590 |
| 34 | K | 41 | 1.2 | 1090 | 0.13 | 560 |
| 35 | L | 44 | 1.2 | 1060 | 0.13 | 550 |
| 36 | M | 36 | 1.0 | 1040 | 0.09 | 600 |
| 37 | N | 40 | 1.1 | 1070 | 0.09 | 620 |
| 38 | O | 43 | 1.1 | 1050 | 0.05 | 530 |
| 39 | P | 39 | 0.7 | 1050 | 0.09 | 600 |
| 40 | Q̲ | 41 | 1.2 | 1050 | 0.12 | 580 |
| 41 | R̲ | 40 | 1.0 | 1030 | 0.08 | 600 |
| 42 | S̲ | 38 | 1.1 | 1020 | 0.09 | 540 |
| 43 | T̲ | 42 | 0.9 | 1040 | 0.12 | 560 |
| 44 | U̲ | 41 | 1.0 | 1030 | 0.09 | 540 |
| 45 | V̲ | 40 | 0.9 | 1010 | 0.10 | 510 |
| 46 | W̲ | 43 | 1.1 | 1080 | 0.12 | 550 |
| 47 | X̲ | 35 | 1.2 | 1020 | 0.09 | 570 |
| 48 | Y̲ | 44 | 1.0 | 1010 | 0.09 | 570 |
| 49 | Z̲ | 37 | 1.0 | 1080 | 0.10 | 540 |

| | Pickling step | | | | Hot rolling temp. | | | First cooling |
|---|---|---|---|---|---|---|---|---|
| | | | Average speed in 70 to 90° C. aqueous solution | Pickling time | Cold rolling step Rolling reduction | 650 to Ac1° C. average heating speed | Soaking | | 550 to 650° C. average cooling speed |
| No. | [HCl] mol/L | [Fe$^{2+}$] mol/L | m/min | s | % | ° C./s | Peak heating temp. ° C. | Holding time s | ° C./s |
| b1 | 2.4 | 1.3 | 70 | 50 | 53 | 2.3 | 840 | 100 | 30 |
| 2 | 2.4 | 1.3 | 70 | 50 | 53 | 2.3 | 840 | 100 | 30 |
| 3 | 2.4 | 1.3 | 70 | 50 | 53 | 2.3 | 840 | 100 | 30 |
| 4 | 2.4 | 1.3 | 70 | 50 | 53 | 2.3 | 840 | 100 | 30 |
| 5 | 2.4 | 1.3 | 70 | 50 | 53 | 2.3 | 840 | 100 | 30 |
| 6 | 2.4 | 1.3 | 70 | 50 | 53 | 2.3 | 840 | 100 | 30 |
| 7 | 2.4 | 1.3 | 70 | 50 | 53 | 2.3 | 840 | 100 | 30 |
| 8 | 2.4 | 1.3 | 70 | 50 | 53 | 2.3 | 840 | 100 | 30 |
| 9 | 2.4 | 1.3 | 70 | 50 | 53 | 2.3 | 840 | 100 | 30 |
| 10 | 2.4 | 1.3 | 70 | 50 | 53 | 2.3 | 840 | 100 | 30 |
| 11 | 2.4 | 1.3 | 70 | 50 | 53 | 2.3 | 840 | 100 | 30 |
| 12 | 2.4 | 1.3 | 70 | 50 | 53 | 2.3 | 840 | 100 | 30 |
| 13 | 0.5̲ | 1.3 | 70 | 50 | 53 | 2.3 | 840 | 100 | 30 |
| 14 | 2.4 | 5.1̲ | 70 | 50 | 53 | 2.3 | 840 | 100 | 30 |
| 15 | 2.4 | 1.3 | 5̲ | 50 | 53 | 2.3 | 840 | 100 | 30 |
| 16 | 2.4 | 1.3 | 70 | 15̲ | 53 | 2.3 | 840 | 100 | 30 |
| 17 | 2.4 | 1.3 | 70 | 50 | 53 | 1.1̲ | 740 | 100 | 30 |
| 18 | 2.4 | 1.3 | 70 | 50 | 53 | 15.0̲ | 840 | 100 | 30 |
| 19 | 2.4 | 1.3 | 70 | 50 | 53 | 2.3 | 840 | 100 | 30 |
| 20 | 2.4 | 1.3 | 70 | 50 | 53 | 2.3 | 840 | 100 | 30 |
| 21 | 2.4 | 1.3 | 70 | 50 | 53 | 2.3 | 840 | 100 | 30 |
| 22 | 2.4 | 1.3 | 70 | 50 | 53 | 2.3 | 840 | 100 | 30 |
| 23 | 2.4 | 1.3 | 70 | 50 | 53 | 2.3 | 840 | 100 | 2̲ |
| 24 | 3.1 | 1.5 | 70 | 50 | 53 | 3.0 | 900 | 100 | 100̲ |
| 25 | 2.6 | 1.0 | 70 | 50 | 53 | 2.3 | 820 | 100 | 30 |
| 26 | 2.4 | 1.3 | 70 | 50 | 53 | 2.9 | 850 | 100 | 30 |
| 27 | 2.4 | 1.3 | 70 | 50 | 53 | 2.5 | 860 | 100 | 30 |
| 28 | 2.9 | 1.1 | 70 | 50 | 53 | 2.3 | 870 | 400 | 30 |
| 29 | 2.2 | 1.3 | 70 | 50 | 53 | 4.5 | 920 | 100 | 30 |
| 30 | 3.0 | 2.0 | 70 | 50 | 53 | 2.3 | 880 | 100 | 30 |
| 31 | 2.5 | 1.4 | 70 | 50 | 53 | 3.2 | 870 | 100 | 30 |
| 32 | 2.5 | 1.4 | 70 | 50 | 53 | 3.2 | 880 | 100 | 30 |
| 33 | 2.5 | 1.4 | 130 | 50 | 53 | 3.2 | 870 | 100 | 30 |
| 34 | 2.4 | 1.2 | 30 | 50 | 53 | 3.2 | 870 | 100 | 30 |
| 35 | 2.4 | 1.2 | 70 | 50 | 53 | 4.1 | 910 | 100 | 30 |
| 36 | 2.4 | 1.2 | 70 | 50 | 53 | 2.4 | 840 | 100 | 30 |
| 37 | 2.4 | 1.2 | 70 | 50 | 53 | 2.5 | 860 | 100 | 30 |
| 38 | 2.4 | 1.2 | 70 | 50 | 53 | 2.5 | 850 | 100 | 30 |
| 39 | 2.4 | 1.2 | 70 | 50 | 53 | 2.9 | 890 | 100 | 30 |
| 40 | 2.4 | 1.3 | 70 | 50 | 53 | 2.1 | 820 | 100 | 30 |
| 41 | 2.4 | 1.3 | 70 | 50 | 53 | 2.3 | 860 | 100 | 30 |
| 42 | 2.4 | 1.3 | 70 | 50 | 53 | 4.0 | 900 | 100 | 30 |
| 43 | 2.4 | 1.3 | 70 | 50 | 53 | 2.1 | 820 | 100 | 30 |
| 44 | 2.4 | 1.3 | 70 | 50 | 53 | 2.6 | 870 | 100 | 30 |
| 45 | 2.4 | 1.3 | 70 | 50 | 53 | 2.5 | 850 | 100 | 30 |

TABLE 2-continued

| No. | | | | | | | | | |
|---|---|---|---|---|---|---|---|---|---|
| 46 | 2.4 | 1.3 | 70 | 50 | 53 | 2.5 | 860 | 100 | 30 |
| 47 | 2.4 | 1.3 | 70 | 50 | 53 | 2.5 | 880 | 100 | 30 |
| 48 | 2.4 | 1.3 | 70 | 50 | 53 | 2.5 | 850 | 100 | 30 |
| 49 | 2.4 | 1.3 | 70 | 50 | 53 | 2.8 | 870 | 100 | 30 |

| | Hot rolling temp. | | | | |
|---|---|---|---|---|---|
| | Second cooling | | | Low temp. holding | | |
| | Cooling | | | | | Surface |
| No. | stop temp. °C. | Ms-150 °C. | Ms °C. | Heating temp. °C. | Holding time s | (CR/GA/GI) |
| b1 | 250 | 160 | 310 | 400 | 330 | CR |
| 2 | 250 | 160 | 310 | 400 | 330 | CR |
| 3 | 250 | 160 | 310 | 400 | 330 | CR |
| 4 | 250 | 160 | 310 | 400 | 330 | CR |
| 5 | 250 | 160 | 310 | 400 | 330 | CR |
| 6 | 250 | 160 | 310 | 400 | 330 | CR |
| 7 | 250 | 160 | 310 | 400 | 330 | CR |
| 8 | 250 | 160 | 310 | 400 | 330 | CR |
| 9 | 250 | 160 | 310 | 400 | 330 | CR |
| 10 | 250 | 160 | 310 | 400 | 330 | CR |
| 11 | 250 | 170 | 320 | 400 | 330 | CR |
| 12 | 250 | 140 | 290 | 400 | 330 | CR |
| 13 | 250 | 160 | 310 | 400 | 330 | CR |
| 14 | 250 | 170 | 320 | 400 | 330 | CR |
| 15 | 250 | 160 | 310 | 400 | 330 | CR |
| 16 | 250 | 160 | 310 | 400 | 330 | CR |
| 17 | 150 | 10 | 160 | 400 | 330 | CR |
| 18 | 250 | 190 | 340 | 400 | 330 | CR |
| 19 | 350 | 150 | 300 | 400 | 330 | CR |
| 20 | <u>100</u> | 170 | 320 | 400 | 330 | CR |
| 21 | 250 | 160 | 310 | <u>300</u> | 330 | CR |
| 22 | 250 | 160 | 310 | 400 | <u>30</u> | CR |
| 23 | 200 | 60 | 210 | 400 | 330 | CR |
| 24 | 220 | 140 | 290 | 420 | 330 | CR |
| 25 | 270 | 230 | 380 | 400 | 330 | CR |
| 26 | 230 | 150 | 300 | 380 | 330 | CR |
| 27 | 240 | 150 | 300 | 420 | 330 | CR |
| 28 | 240 | 170 | 320 | 400 | 330 | CR |
| 29 | 250 | 190 | 340 | 400 | 80 | CR |
| 30 | 250 | 180 | 330 | 400 | 900 | CR |
| 31 | 250 | 180 | 330 | 370 | 330 | CR |
| 32 | 250 | 180 | 330 | <u>550</u> | 330 | CR |
| 33 | 250 | 200 | 350 | <u>370</u> | 330 | CR |
| 34 | 250 | 220 | 370 | 400 | 330 | CR |
| 35 | 270 | 210 | 360 | 400 | 330 | CR |
| 36 | 260 | 200 | 350 | 330 | 330 | CR |
| 37 | 280 | 180 | 330 | 400 | 330 | CR |
| 38 | 280 | 200 | 350 | 390 | 330 | CR |
| 39 | 270 | 200 | 350 | 410 | 330 | CR |
| 40 | 250 | 160 | 310 | 400 | 330 | CR |
| 41 | 260 | 170 | 320 | 400 | 330 | CR |
| 42 | 230 | 100 | 250 | 400 | 330 | CR |
| 43 | 240 | 210 | 360 | 400 | 330 | CR |
| 44 | 270 | 220 | 370 | 400 | 330 | CR |
| 45 | 200 | 80 | 230 | 400 | 330 | CR |
| 46 | 150 | 50 | 200 | 400 | 330 | CR |
| 47 | 240 | 170 | 320 | 400 | 330 | CR |
| 48 | 240 | 160 | 310 | 400 | 330 | CR |
| 49 | 240 | 190 | 340 | 400 | 330 | CR |

Underlines show outside scope of present invention.

TABLE 3

| | | | | Microstructure | | | | | |
|---|---|---|---|---|---|---|---|---|---|
| No. | Steel type | Surface (CR/GA/GI) | Ferrite % | Nonrecrystallized ferrite/total ferrite % | Retained austenite % | Tempered martensite % | Fresh martensite % | Pearlite + cementite % | Bainite % |
| 1 | A | CR | 37 | 3 | 12 | 26 | 3 | 0 | 22 |
| 2 | A | CR | 37 | 5 | 12 | 26 | 3 | 0 | 22 |

TABLE 3-continued

| No. | Steel type | | | | | | | | |
|---|---|---|---|---|---|---|---|---|---|
| 3 | A | CR | 35 | 5 | 12 | 26 | 3 | 0 | 24 |
| 4 | A | CR | 37 | 4 | 12 | 26 | 3 | 0 | 22 |
| 5 | A | CR | 36 | 4 | 12 | 26 | 3 | 0 | 23 |
| 6 | A | CR | 36 | 3 | 12 | 26 | 2 | 0 | 24 |
| 7 | A | CR | 35 | 5 | 12 | 26 | 4 | 0 | 23 |
| 8 | A | CR | 39 | 4 | 12 | 26 | 3 | 0 | 20 |
| 9 | A | CR | 36 | $\overline{67}$ | 9 | 32 | 5 | 0 | 18 |
| 10 | A | CR | 37 | $\overline{5}$ | 12 | 26 | 3 | 0 | 22 |
| 11 | A | CR | 34 | 3 | 12 | 26 | 3 | 0 | 25 |
| 12 | A | CR | 45 | 6 | 10 | 23 | 5 | 0 | 17 |
| 13 | A | CR | 36 | 2 | 12 | 26 | 3 | 0 | 23 |
| 14 | A | CR | 34 | 5 | 12 | 26 | 3 | 0 | 25 |
| 15 | A | CR | 37 | 4 | 12 | 26 | 3 | 0 | 22 |
| 16 | A | CR | 35 | 5 | 12 | 26 | 3 | 0 | 24 |
| 17 | A | CR | $\overline{68}$ | 20 | 7 | 10 | 5 | 0 | 10 |
| 18 | A | CR | $\overline{24}$ | $\overline{80}$ | 8 | 30 | 7 | 0 | 31 |
| 19 | A | CR | 37 | $\overline{5}$ | 10 | $\overline{0}$ | 5 | 0 | 48 |
| 20 | A | CR | 35 | 4 | $\overline{3}$ | $\overline{60}$ | 0 | 0 | 2 |
| 21 | A | CR | 38 | 5 | $\overline{2}$ | 26 | $\overline{20}$ | 0 | 14 |
| 22 | A | CR | 37 | 4 | $\overline{3}$ | 26 | $\overline{18}$ | 0 | 16 |
| 23 | A | CR | $\overline{62}$ | 5 | $\overline{6}$ | 15 | $\overline{2}$ | $\overline{6}$ | 9 |
| 24 | B | CR | $\overline{26}$ | 9 | 17 | 25 | 4 | $\overline{0}$ | 28 |
| 25 | C | CR | 18 | 5 | 8 | 55 | 2 | 0 | 17 |
| 26 | D | CR | 49 | 4 | 10 | 22 | 3 | 0 | 16 |
| 27 | E | CR | 39 | 45 | 11 | 31 | 4 | 0 | 15 |
| 28 | F | CR | 33 | 2 | 14 | 33 | 2 | 0 | 18 |
| 29 | G | CR | 40 | 30 | 8 | 35 | 6 | 0 | 11 |
| 30 | H | CR | 35 | 30 | 9 | 30 | 1 | 0 | 25 |
| 31 | I | CR | 17 | 0 | 11 | 52 | 3 | 0 | 17 |
| 32 | I | CR | 17 | 0 | 4 | 50 | $\overline{13}$ | $\overline{7}$ | 9 |
| 33 | J | CR | 12 | 6 | $\overline{10}$ | 60 | $\overline{2}$ | $\overline{0}$ | 16 |
| 34 | K | CR | 4 | 0 | 9 | 70 | 3 | 0 | 14 |
| 35 | L | CR | 9 | 0 | 7 | 72 | 4 | 0 | 8 |
| 36 | M | CR | 20 | 5 | 10 | 50 | 3 | 0 | 17 |
| 37 | N | CR | 23 | 4 | 12 | 43 | 3 | 0 | 19 |
| 38 | O | CR | 15 | 5 | 11 | 50 | 2 | 0 | 22 |
| 39 | P | CR | 16 | 2 | 14 | 49 | 4 | 0 | 17 |
| 40 | Q | CR | 39 | 0 | 13 | 23 | 3 | 0 | 22 |
| 41 | $\overline{R}$ | CR | 21 | 5 | 13 | 46 | 2 | 0 | 18 |
| 42 | $\overline{S}$ | CR | $\overline{60}$ | 0 | 9 | 12 | 6 | 0 | 13 |
| 43 | $\overline{T}$ | CR | $\overline{18}$ | 5 | $\overline{4}$ | 34 | 2 | 0 | 42 |
| 44 | $\overline{U}$ | CR | 25 | 5 | $\overline{4}$ | 33 | 3 | 0 | 35 |
| 45 | $\overline{V}$ | CR | 36 | 4 | $\overline{21}$ | 16 | $\overline{12}$ | 0 | 15 |
| 46 | $\overline{W}$ | CR | $\overline{66}$ | 3 | 9 | 3 | $\overline{4}$ | 0 | 18 |
| 47 | $\overline{X}$ | CR | $\overline{18}$ | 4 | 7 | 58 | $\overline{13}$ | 0 | 4 |
| 48 | $\overline{Y}$ | CR | 33 | $\overline{75}$ | 8 | 34 | $\overline{6}$ | 0 | 19 |
| 49 | $\overline{Z}$ | CR | 30 | $\overline{65}$ | 8 | 30 | 2 | 0 | 30 |

| No. | Steel type | $Al_S / Si_S \leq 0.2$ area ratio % | TS MPa | El % | λ % | TS × El × $\lambda^{0.5}$ × $10^{-3}$ | Cracking of spot welded part | Remarks |
|---|---|---|---|---|---|---|---|---|
| 1 | A | 4 | 1015 | 23.0 | 31 | 130 | Good | Ex. |
| 2 | A | $\overline{62}$ | 1018 | 22.7 | 32 | 131 | Poor | Comp. ex. |
| 3 | A | $\overline{73}$ | 1000 | 23.3 | 27 | 121 | Poor | Comp. ex. |
| 4 | A | $\overline{64}$ | 1005 | 24.1 | 26 | 124 | Poor | Comp. ex. |
| 5 | A | $\overline{81}$ | 992 | 23.5 | 30 | 128 | Poor | Comp. ex. |
| 6 | A | $\overline{67}$ | 1010 | 23.2 | 33 | 135 | Poor | Comp. ex. |
| 7 | A | $\overline{76}$ | 1015 | 22.7 | 29 | 124 | Poor | Comp. ex. |
| 8 | A | $\overline{65}$ | 1013 | 23.8 | 34 | 141 | Poor | Comp. ex. |
| 9 | A | $\overline{8}$ | 1068 | 15.0 | 24 | $\overline{78}$ | Good | Comp. ex. |
| 10 | A | 77 | 1002 | 23.6 | 27 | $\overline{123}$ | Poor | Comp. ex. |
| 11 | A | $\overline{70}$ | 995 | 22.6 | 35 | 133 | Poor | Comp. ex. |
| 12 | A | $\overline{58}$ | 987 | 21.9 | 33 | 124 | Poor | Comp. ex. |
| 13 | A | $\overline{80}$ | 1015 | 23.0 | 31 | 130 | Poor | Comp. ex. |
| 14 | A | $\overline{85}$ | 1015 | 23.0 | 31 | 130 | Poor | Comp. ex. |
| 15 | A | $\overline{72}$ | 1015 | 23.0 | 31 | 130 | Poor | Comp. ex. |
| 16 | A | $\overline{68}$ | 1015 | 23.0 | 31 | 130 | Poor | Comp. ex. |
| 17 | A | $\overline{4}$ | $\overline{821}$ | 30.8 | 30 | 139 | Good | Comp. ex. |
| 18 | A | 3 | $\overline{1107}$ | 15.9 | 22 | $\overline{83}$ | Good | Comp. ex. |
| 19 | A | 6 | 895 | 22.5 | 18 | $\overline{85}$ | Good | Comp. ex. |
| 20 | A | 7 | $\overline{1169}$ | 10.8 | 46 | $\overline{86}$ | Good | Comp. ex. |
| 21 | A | 8 | 1226 | 11.0 | 29 | $\overline{73}$ | Good | Comp. ex. |
| 22 | A | 3 | 1110 | 15.3 | 25 | $\overline{85}$ | Good | Comp. ex. |
| 23 | A | 4 | $\overline{818}$ | 23.1 | 28 | $\overline{100}$ | Good | Comp. ex. |
| 24 | B | 3 | $\overline{1067}$ | 21.6 | 25 | 115 | Good | Ex. |
| 25 | C | 12 | 1020 | 16.5 | 43 | 110 | Good | Ex. |
| 26 | D | 7 | 1000 | 21.3 | 35 | 126 | Good | Ex. |

TABLE 3-continued

| | | | | | | | | | |
|---|---|---|---|---|---|---|---|---|---|
| 27 | E | 8 | 1074 | 17.3 | 26 | 95 | Good | Ex. | |
| 28 | F | 5 | 1007 | 23.0 | 30 | 127 | Good | Ex. | |
| 29 | G | 0 | 1099 | 16.1 | 29 | 95 | Good | Ex. | |
| 30 | H | 19 | 1051 | 18.2 | 26 | 98 | Good | Ex. | |
| 31 | I | 7 | 1213 | 15.6 | 42 | 123 | Good | Ex. | |
| 32 | I | 7 | 1085 | 15.4 | 24 | <u>82</u> | Good | Comp. ex. | |
| 33 | J | 4 | 1220 | 14.9 | 50 | 129 | Good | Ex. | |
| 34 | K | 5 | 1245 | 11.8 | 60 | 114 | Good | Ex. | |
| 35 | L | 2 | 1235 | 11.0 | 56 | 102 | Good | Ex. | |
| 36 | M | 8 | 1226 | 12.0 | 40 | 93 | Good | Ex. | |
| 37 | N | 2 | 1202 | 16.4 | 37 | 120 | Good | Ex. | |
| 38 | O | 2 | 1156 | 14.5 | 39 | 105 | Good | Ex. | |
| 39 | P | 4 | 1247 | 17.1 | 34 | 124 | Good | Ex. | |
| 40 | <u>Q</u> | <u>58</u> | 994 | 24.2 | 28 | 127 | Poor | Comp. ex. | |
| 41 | <u>R</u> | <u>20</u> | 1140 | 18.9 | 33 | 124 | Poor | Comp. ex. | |
| 42 | <u>S</u> | 2 | <u>914</u> | 20.5 | 26 | 96 | Good | Comp. ex. | |
| 43 | <u>T</u> | 0 | 1138 | 11.2 | 38 | <u>79</u> | Good | Comp. ex. | |
| 44 | <u>U</u> | 4 | 1070 | 16.1 | 26 | <u>88</u> | Good | Comp. ex. | |
| 45 | <u>V</u> | 2 | 1096 | 21.3 | 14 | <u>87</u> | Good | Comp. ex. | |
| 46 | <u>W</u> | 7 | <u>829</u> | 30.1 | 28 | 132 | Good | Comp. ex. | |
| 47 | <u>X</u> | 2 | 1203 | 15.0 | 22 | <u>85</u> | Good | Comp. ex. | |
| 48 | <u>Y</u> | 5 | 1062 | 17.4 | 21 | <u>85</u> | Good | Comp. ex. | |
| 49 | <u>Z</u> | 2 | 1079 | 17.0 | 20 | <u>82</u> | Good | Comp. ex. | |

Underlines show outside scope of present invention

TABLE 4

| | | | Hot rolling step | | | | | | |
|---|---|---|---|---|---|---|---|---|---|
| | | | Rough rolling | | | | | Finish rolling | |
| | | | No. of rolling passes at steel sheet temp. 1050 to 1200° C. and rolling reduction more than 20% X | Descaling | | | Finish rolling | | |
| No. | Steel type | Slab heating temp. ° C. | | Rolling reduction of rolling pass right before % | Time until performance after passing through rolling pass s | Steel sheet temp. of rolling pass right before ° C. | Finish rolling entry temp. ° C. | Finish rolling exit temp. ° C. | Finish rolling total rolling reduction % |
| 50 | A | 1260 | 5 | 30 | 4 | 1140 | 1080 | 960 | 91 |
| 51 | B | 1240 | 5 | 32 | 6 | 1080 | 1020 | 900 | 91 |
| 52 | C | 1220 | 5 | 28 | 3 | 1160 | 1070 | 980 | 91 |
| 53 | D | 1260 | 5 | 28 | 4 | 1120 | 1010 | 890 | 91 |
| 54 | E | 1260 | 5 | 34 | 2 | 1140 | 1080 | 960 | 91 |
| 55 | F | 1270 | 5 | 27 | 4 | 1130 | 1050 | 960 | 91 |
| 56 | G | 1250 | 5 | 32 | 3 | 1090 | 1020 | 930 | 91 |
| 57 | H | 1220 | 5 | 27 | 6 | 1160 | 1070 | 950 | 91 |
| 58 | I | 1250 | 5 | 36 | 3 | 1120 | 1060 | 950 | 91 |
| 59 | J | 1220 | 5 | 34 | 2 | 1120 | 1040 | 930 | 91 |
| 60 | K | 1230 | 5 | 32 | 2 | 1130 | 1030 | 920 | 91 |
| 61 | L | 1230 | 5 | 34 | 5 | 1160 | 1070 | 940 | 91 |
| 62 | M | 1240 | 5 | 33 | 5 | 1160 | 1070 | 960 | 91 |
| 63 | N | 1280 | 5 | 30 | 2 | 1170 | 1080 | 980 | 91 |
| 64 | O | 1260 | 5 | 28 | 6 | 1150 | 1080 | 980 | 91 |
| 65 | P | 1270 | 5 | 31 | 5 | 1110 | 1000 | 890 | 91 |
| 66 | <u>Q</u> | 1220 | 5 | 30 | 3 | 1140 | 1060 | 980 | 91 |
| 67 | <u>R</u> | 1230 | 5 | 34 | 5 | 1120 | 1050 | 930 | 91 |
| 68 | <u>S</u> | 1270 | 5 | 27 | 3 | 1120 | 1030 | 940 | 91 |
| 69 | <u>T</u> | 1270 | 5 | 29 | 3 | 1130 | 1020 | 900 | 91 |
| 70 | <u>U</u> | 1220 | 5 | 36 | 6 | 1120 | 1060 | 940 | 91 |
| 71 | <u>V</u> | 1230 | 5 | 27 | 5 | 1120 | 1030 | 940 | 91 |
| 72 | <u>W</u> | 1250 | 5 | 27 | 2 | 1150 | 1080 | 980 | 91 |
| 73 | <u>X</u> | 1280 | 5 | 33 | 3 | 1160 | 1060 | 950 | 91 |
| 74 | <u>Y</u> | 1240 | 5 | 27 | 6 | 1090 | 990 | 900 | 91 |
| 75 | <u>Z</u> | 1260 | 5 | 36 | 6 | 1120 | 1020 | 920 | 91 |
| 76 | A | 1260 | 5 | 30 | 4 | 1140 | 1080 | 960 | 91 |
| 77 | B | 1240 | 5 | 32 | 6 | 1080 | 1020 | 900 | 91 |
| 78 | C | 1220 | 5 | 28 | 3 | 1160 | 1070 | 980 | 91 |
| 79 | D | 1260 | 5 | 28 | 4 | 1120 | 1010 | 890 | 91 |
| 80 | F | 1260 | 5 | 34 | 2 | 1140 | 1080 | 960 | 91 |
| 81 | F | 1270 | 5 | 27 | 4 | 1130 | 1050 | 960 | 91 |
| 82 | G | 1250 | 5 | 32 | 3 | 1090 | 1020 | 930 | 91 |
| 83 | H | 1220 | 5 | 27 | 6 | 1160 | 1070 | 950 | 91 |
| 84 | I | 1250 | 5 | 36 | 3 | 1120 | 1060 | 950 | 91 |
| 85 | J | 1220 | 5 | 34 | 2 | 1120 | 1040 | 930 | 91 |

TABLE 4-continued

| | | | | | | | | | |
|---|---|---|---|---|---|---|---|---|---|
| 86 | K | 1230 | 5 | 32 | 2 | 1130 | 1030 | 920 | 91 |
| 87 | L | 1230 | 5 | 34 | 5 | 1160 | 1070 | 940 | 91 |
| 88 | M | 1240 | 5 | 33 | 5 | 1160 | 1070 | 960 | 91 |
| 89 | N | 1280 | 5 | 30 | 2 | 1170 | 1080 | 980 | 91 |
| 90 | O | 1260 | 5 | 28 | 6 | 1150 | 1080 | 980 | 91 |
| 91 | P | 1270 | 5 | 31 | 5 | 1110 | 1000 | 890 | 91 |

| | | Hot rolling step | | | | |
|---|---|---|---|---|---|---|
| | | Finish rolling Descaling | | | | |
| No. | Steel type | Rolling reduction of rolling pass right before % | Time until performance after passing through rolling pass s | Steel sheet temp. of rolling pass right before ° C. | Formula(2) | Coiling temp. ° C. |
| 50 | A | 42 | 1.2 | 1050 | 0.14 | 580 |
| 51 | B | 34 | 1.2 | 1000 | 0.15 | 530 |
| 52 | C | 35 | 1.2 | 1050 | 0.13 | 610 |
| 53 | D | 41 | 1.2 | 990 | 0.12 | 540 |
| 54 | E | 39 | 1.2 | 1050 | 0.12 | 590 |
| 55 | F | 40 | 1.2 | 1010 | 0.14 | 510 |
| 56 | G | 43 | 1.2 | 1000 | 0.15 | 500 |
| 57 | H | 37 | 1.2 | 1050 | 0.15 | 510 |
| 58 | I | 43 | 1.2 | 1040 | 0.15 | 540 |
| 59 | J | 37 | 1.2 | 1000 | 0.16 | 620 |
| 60 | K | 34 | 1.2 | 990 | 0.07 | 520 |
| 61 | L | 43 | 1.2 | 1020 | 0.11 | 510 |
| 62 | M | 35 | 1.2 | 1030 | 0.12 | 560 |
| 63 | N | 43 | 1.2 | 1050 | 0.07 | 590 |
| 64 | O | 39 | 1.2 | 1050 | 0.13 | 540 |
| 65 | P | 42 | 1.2 | 970 | 0.14 | 500 |
| 66 | Q | 43 | 1.2 | 1030 | 0.14 | 520 |
| 67 | R | 37 | 1.2 | 1020 | 0.11 | 500 |
| 68 | S | 42 | 1.2 | 1010 | 0.12 | 540 |
| 69 | T | 36 | 1.2 | 1000 | 0.16 | 500 |
| 70 | U | 37 | 1.2 | 1020 | 0.14 | 530 |
| 71 | V | 43 | 1.2 | 1010 | 0.09 | 530 |
| 72 | W | 37 | 1.2 | 1040 | 0.14 | 600 |
| 73 | X | 39 | 1.2 | 1030 | 0.08 | 530 |
| 74 | Y | 36 | 1.2 | 980 | 0.16 | 580 |
| 75 | Z | 40 | 1.2 | 990 | 0.11 | 550 |
| 76 | A | 42 | 1.2 | 1050 | 0.14 | 580 |
| 77 | B | 34 | 1.2 | 1000 | 0.15 | 530 |
| 78 | C | 35 | 1.2 | 1050 | 0.13 | 610 |
| 79 | D | 41 | 1.2 | 990 | 0.12 | 540 |
| 80 | F | 39 | 1.2 | 1050 | 0.12 | 590 |
| 81 | F | 40 | 1.2 | 1010 | 0.14 | 510 |
| 82 | G | 43 | 1.2 | 1000 | 0.15 | 500 |
| 83 | H | 37 | 1.2 | 1050 | 0.15 | 510 |
| 84 | I | 43 | 1.2 | 1040 | 0.15 | 540 |
| 85 | J | 37 | 1.2 | 1000 | 0.16 | 620 |
| 86 | K | 34 | 1.2 | 990 | 0.07 | 520 |
| 87 | L | 43 | 1.2 | 1020 | 0.11 | 510 |
| 88 | M | 35 | 1.2 | 1030 | 0.12 | 560 |
| 89 | N | 43 | 1.2 | 1050 | 0.07 | 590 |
| 90 | O | 39 | 1.2 | 1050 | 0.13 | 540 |
| 91 | P | 42 | 1.2 | 970 | 0.14 | 500 |

| | Pickling step | | | | Hot rolling temp. | | | |
|---|---|---|---|---|---|---|---|---|
| | | | Average speed in 70 to 90° C. aqueous solution m/min | Pickling time s | Cold rolling step Rolling reduction % | 650 to Ac1° C. average heating speed ° C./s | Soaking | | First cooling 550 to 650° C. average cooling speed ° C./s |
| No. | [HCl] mol/L | [Fe$^{2+}$] mol/L | | | | | Peak heating temp. ° C. | Holding time s | |
| 50 | 2.4 | 1.3 | 70 | 50 | 53 | 2.3 | 860 | 80 | 20 |
| 51 | 3.1 | 1.5 | 70 | 50 | 53 | 3.0 | 910 | 80 | 20 |
| 52 | 2.6 | 1.0 | 70 | 50 | 53 | 2.3 | 830 | 80 | 20 |
| 53 | 2.4 | 1.3 | 70 | 50 | 53 | 2.9 | 880 | 80 | 20 |
| 54 | 2.4 | 1.3 | 70 | 50 | 53 | 2.5 | 860 | 80 | 20 |
| 55 | 2.9 | 1.1 | 70 | 50 | 53 | 2.3 | 890 | 80 | 20 |
| 56 | 2.2 | 1.3 | 70 | 50 | 53 | 4.5 | 940 | 80 | 20 |
| 57 | 3.0 | 2.0 | 70 | 50 | 53 | 2.3 | 900 | 10 | 60 |

TABLE 4-continued

| No. | | | | | | | | | |
|---|---|---|---|---|---|---|---|---|---|
| 58 | 2.5 | 1.4 | 70 | 50 | 53 | 3.2 | 880 | 80 | 20 |
| 59 | 2.5 | 1.4 | 130 | 50 | 53 | 3.2 | 870 | 80 | 20 |
| 60 | 2.4 | 1.2 | 30 | 50 | 53 | 3.2 | 870 | 80 | 20 |
| 61 | 2.4 | 1.2 | 70 | 50 | 53 | 4.1 | 910 | 80 | 20 |
| 62 | 2.4 | 1.2 | 70 | 50 | 53 | 2.4 | 840 | 80 | 20 |
| 63 | 2.4 | 1.2 | 70 | 50 | 53 | 2.5 | 860 | 80 | 20 |
| 64 | 2.4 | 1.2 | 70 | 50 | 53 | 2.5 | 850 | 80 | 20 |
| 65 | 2.4 | 1.2 | 70 | 50 | 53 | 2.9 | 890 | 80 | 20 |
| 66 | 2.4 | 1.3 | 70 | 50 | 53 | 2.1 | 820 | 80 | 20 |
| 67 | 2.4 | 1.3 | 70 | 50 | 53 | 2.3 | 860 | 80 | 20 |
| 68 | 2.4 | 1.3 | 70 | 50 | 53 | 4.0 | 910 | 80 | 20 |
| 69 | 2.4 | 1.3 | 70 | 50 | 53 | 2.1 | 820 | 80 | 20 |
| 70 | 2.4 | 1.3 | 70 | 50 | 53 | 2.6 | 870 | 80 | 20 |
| 71 | 2.4 | 1.3 | 70 | 50 | 53 | 2.5 | 850 | 80 | 20 |
| 72 | 2.4 | 1.3 | 70 | 50 | 53 | 2.5 | 860 | 80 | 20 |
| 73 | 2.4 | 1.3 | 70 | 50 | 53 | 2.5 | 880 | 80 | 20 |
| 74 | 2.4 | 1.3 | 70 | 50 | 53 | 2.5 | 850 | 80 | 20 |
| 75 | 2.4 | 1.3 | 70 | 50 | 53 | 2.8 | 870 | 80 | 20 |
| 76 | 2.4 | 1.3 | 70 | 50 | 53 | 2.3 | 870 | 80 | 20 |
| 77 | 3.1 | 1.5 | 70 | 50 | 53 | 3.0 | 920 | 80 | 20 |
| 78 | 2.6 | 1.0 | 70 | 50 | 53 | 2.3 | 820 | 80 | 20 |
| 79 | 2.4 | 1.3 | 70 | 50 | 53 | 2.9 | 870 | 80 | 20 |
| 80 | 2.4 | 1.3 | 70 | 50 | 53 | 2.5 | 870 | 80 | 20 |
| 81 | 2.9 | 1.1 | 70 | 50 | 53 | 2.3 | 890 | 80 | 20 |
| 82 | 2.2 | 1.3 | 70 | 50 | 53 | 4.5 | 930 | 80 | 20 |
| 83 | 3.0 | 2.0 | 70 | 50 | 53 | 2.3 | 890 | 80 | 50 |
| 84 | 2.5 | 1.4 | 70 | 50 | 53 | 3.2 | 870 | 80 | 20 |
| 85 | 2.5 | 1.4 | 130 | 50 | 53 | 3.2 | 870 | 80 | 20 |
| 86 | 2.4 | 1.2 | 30 | 50 | 53 | 3.2 | 880 | 80 | 20 |
| 87 | 2.4 | 1.2 | 70 | 50 | 53 | 4.1 | 910 | 80 | 20 |
| 88 | 2.4 | 1.2 | 70 | 50 | 53 | 2.4 | 850 | 80 | 20 |
| 89 | 2.4 | 1.2 | 70 | 50 | 53 | 2.5 | 860 | 80 | 20 |
| 90 | 2.4 | 1.2 | 70 | 50 | 53 | 2.5 | 840 | 80 | 20 |
| 91 | 2.4 | 1.2 | 70 | 50 | 53 | 2.9 | 900 | 80 | 20 |

| | Hot rolling temp. | | | | | |
|---|---|---|---|---|---|---|
| | Second cooling | | | Low temp. holding | | Surface |
| No. | Cooling stop temp. °C | Ms-150 °C | Ms °C | Heating temp. °C | Holding time s | (CR/GA/GI) |
| 50 | 70 | 40 | 190 | 350 | 160 | GA |
| 51 | 60 | −30 | 120 | 400 | 160 | GA |
| 52 | 260 | 170 | 320 | 400 | 160 | GA |
| 53 | 150 | 100 | 250 | 380 | 160 | GA |
| 54 | 200 | 110 | 260 | 440 | 160 | GA |
| 55 | 50 | −70 | 80 | 400 | 160 | GA |
| 56 | 180 | 170 | 320 | 400 | 160 | GA |
| 57 | 190 | 100 | 250 | 400 | 80 | GA |
| 58 | 230 | 170 | 320 | 400 | 160 | GA |
| 59 | 260 | 200 | 350 | 400 | 160 | GA |
| 60 | 250 | 220 | 370 | 400 | 160 | GA |
| 61 | 250 | 210 | 360 | 400 | 160 | GA |
| 62 | 260 | 200 | 350 | 400 | 160 | GA |
| 63 | 250 | 180 | 330 | 400 | 160 | GA |
| 64 | 250 | 190 | 340 | 400 | 160 | GA |
| 65 | 260 | 200 | 350 | 400 | 160 | GA |
| 66 | 250 | 150 | 300 | 400 | 160 | GA |
| 67 | 210 | 170 | 320 | 400 | 160 | GA |
| 68 | 150 | 80 | 230 | 400 | 160 | GA |
| 69 | 240 | 180 | 330 | 400 | 160 | GY/A |
| 70 | 260 | 170 | 320 | 400 | 160 | GA |
| 71 | 140 | 40 | 190 | 400 | 160 | GA |
| 72 | 60 | −90 | 60 | 400 | 160 | GA |
| 73 | 220 | 170 | 320 | 400 | 160 | GA |
| 74 | 190 | 110 | 260 | 400 | 160 | GA |
| 75 | 200 | 140 | 290 | 400 | 160 | GA |
| 76 | 70 | 10 | 160 | 370 | 160 | GI |
| 77 | 60 | −10 | 140 | 390 | 160 | GI |
| 78 | 260 | 160 | 310 | 400 | 160 | GI |
| 79 | 150 | 90 | 240 | 380 | 160 | GI |
| 80 | 200 | 100 | 250 | 400 | 160 | GI |
| 81 | 50 | −40 | 110 | 400 | 160 | GI |
| 82 | 170 | 160 | 310 | 400 | 160 | GI |
| 83 | 190 | 80 | 230 | 400 | 160 | GI |
| 84 | 230 | 170 | 320 | 400 | 160 | GI |
| 85 | 260 | 200 | 350 | 400 | 160 | GI |

TABLE 4-continued

|   |     |     |     |     |     |    |
|---|-----|-----|-----|-----|-----|----|
| 86| 230 | 220 | 370 | 360 | 160 | GI |
| 87| 250 | 210 | 360 | 400 | 160 | GI |
| 88| 260 | 210 | 360 | 400 | 160 | GI |
| 89| 250 | 180 | 330 | 400 | 160 | GI |
| 90| 250 | 190 | 340 | 400 | 160 | GI |
| 91| 260 | 210 | 360 | 400 | 160 | GI |

Underlines show outside scope of present invention

TABLE 5

| No. | Steel type | Surface (CR/GA/GI) | Ferrite % | Nonrecrystallized ferrite/total ferrite % | Retained austenite % | Tempered martensite % | Fresh martensite % | Pearlite + cementite % | Bainite % |
|---|---|---|---|---|---|---|---|---|---|
| 50 | A | GA | 37 | 5 | 12 | 16 | 0 | 0 | 35 |
| 51 | B | GA | 42 | 5 | 14 | 18 | 0 | 0 | 26 |
| 52 | C | GA | 15 | 5 | 8 | 27 | 2 | 0 | 48 |
| 53 | D | GA | 41 | 5 | 10 | 22 | 3 | 0 | 24 |
| 54 | E | GA | 38 | 45 | 10 | 31 | 5 | 0 | 16 |
| 55 | F | GA | 45 | 5 | 13 | 8 | 0 | 0 | 34 |
| 56 | G | GA | 41 | 30 | 7 | 40 | 2 | 0 | 10 |
| 57 | H | GA | 30 | 5 | 10 | 19 | 3 | 0 | 38 |
| 58 | I | GA | 17 | 5 | 12 | 47 | 3 | 0 | 21 |
| 59 | J | GA | 12 | 5 | 10 | 60 | 2 | 0 | 16 |
| 60 | K | GA | 4 | 0 | 8 | 71 | 2 | 0 | 15 |
| 61 | L | GA | 9 | 0 | 7 | 72 | 4 | 0 | 8 |
| 62 | M | GA | 20 | 5 | 10 | 50 | 3 | 0 | 17 |
| 63 | N | GA | 23 | 5 | 12 | 43 | 3 | 0 | 19 |
| 64 | O | GA | 15 | 5 | 11 | 50 | 2 | 0 | 22 |
| 65 | P | GA | 16 | 5 | 14 | 49 | 4 | 0 | 17 |
| 66 | Q | GA | 39 | 0 | 13 | 23 | 3 | 0 | 22 |
| 67 | R | GA | 21 | 5 | 13 | 47 | 2 | 0 | 17 |
| 68 | S | GA | 62 | 0 | 9 | 10 | 6 | 0 | 13 |
| 69 | T | GA | 20 | 5 | 4 | 36 | 2 | 0 | 38 |
| 70 | U | GA | 23 | 5 | 4 | 30 | 3 | 0 | 40 |
| 71 | V | GA | 35 | 5 | 22 | 15 | 14 | 0 | 14 |
| 72 | W | GA | 65 | 5 | 10 | 0 | 4 | 0 | 21 |
| 73 | X | GA | 18 | 5 | 8 | 52 | 13 | 0 | 9 |
| 74 | Y | GA | 29 | 70 | 8 | 29 | 6 | 0 | 28 |
| 75 | Z | GA | 26 | 65 | 8 | 33 | 2 | 0 | 31 |
| 76 | A | GI | 33 | 5 | 13 | 10 | 0 | 0 | 44 |
| 77 | B | GI | 40 | 5 | 14 | 20 | 0 | 0 | 26 |
| 78 | C | GI | 18 | 5 | 8 | 25 | 2 | 0 | 47 |
| 79 | D | GI | 39 | 5 | 9 | 21 | 2 | 0 | 29 |
| 80 | E | GI | 35 | 40 | 10 | 28 | 3 | 0 | 24 |
| 81 | F | GI | 44 | 5 | 13 | 10 | 0 | 0 | 33 |
| 82 | G | GI | 42 | 35 | 8 | 35 | 3 | 0 | 12 |
| 83 | H | GI | 32 | 5 | 11 | 16 | 2 | 0 | 39 |
| 84 | I | GI | 20 | 5 | 10 | 45 | 4 | 0 | 21 |
| 85 | J | GI | 12 | 5 | 10 | 58 | 2 | 0 | 18 |
| 86 | K | GI | 2 | 5 | 7 | 70 | 2 | 0 | 19 |
| 87 | L | GI | 9 | 5 | 8 | 68 | 3 | 0 | 12 |
| 88 | M | GI | 16 | 5 | 11 | 53 | 3 | 0 | 17 |
| 89 | N | GI | 22 | 5 | 12 | 42 | 3 | 0 | 21 |
| 90 | O | GI | 17 | 5 | 12 | 44 | 2 | 0 | 25 |
| 91 | P | GI | 12 | 5 | 14 | 50 | 2 | 0 | 22 |

| No. | Steel type | Surface (CR/GA/GI) | $Al_S/Si_S \leq 0.2$ area ratio % | TS MPa | El % | λ % | TS × El × $λ^{0.5}$ × $10^{-3}$ | Cracking of spot welded part | Remarks |
|---|---|---|---|---|---|---|---|---|---|
| 50 | A | GA | 5 | 1046 | 21.0 | 36 | 132 | Good | Ex. |
| 51 | B | GA | 3 | 1015 | 23.1 | 24 | 115 | Good | Ex. |
| 52 | C | GA | 12 | 1006 | 17.2 | 43 | 113 | Good | Ex. |
| 53 | D | GA | 7 | 1000 | 21.3 | 35 | 126 | Good | Ex. |
| 54 | E | GA | 5 | 1074 | 17.6 | 26 | 96 | Good | Ex. |
| 55 | F | GA | 4 | 985 | 25.0 | 28 | 130 | Good | Ex. |
| 56 | G | GA | 5 | 1104 | 16.8 | 26 | 95 | Good | Ex. |
| 57 | H | GA | 5 | 1012 | 21.8 | 30 | 121 | Good | Ex. |
| 58 | I | GA | 6 | 1208 | 16.1 | 40 | 123 | Good | Ex. |
| 59 | J | GA | 5 | 1219 | 15.3 | 49 | 131 | Good | Ex. |
| 60 | K | GA | 7 | 1199 | 12.0 | 54 | 106 | Good | Ex. |

TABLE 5-continued

| | | | | | | | | | |
|---|---|---|---|---|---|---|---|---|---|
| 61 | L | GA | 5 | 1223 | 11.7 | 57 | 108 | Good | Ex. |
| 62 | M | GA | 9 | 1242 | 13.3 | 35 | 98 | Good | Ex. |
| 63 | N | GA | 5 | 1190 | 16.4 | 37 | 119 | Good | Ex. |
| 64 | O | GA | 2 | 1149 | 14.4 | 40 | 105 | Good | Ex. |
| 65 | P | GA | 5 | 1230 | 17.2 | 38 | 130 | Good | Ex. |
| 66 | Q | GA | <u>61</u> | 998 | 23.9 | 25 | 119 | Poor | Comp. ex. |
| 67 | <u>R</u> | GA | <u>25</u> | 1137 | 18.8 | 35 | 126 | Poor | Comp. ex. |
| 68 | <u>S</u> | GA | 2 | <u>930</u> | 21.1 | 20 | <u>88</u> | Good | Comp. ex. |
| 69 | <u>T</u> | GA | 0 | 1<u>140</u> | 11.5 | 33 | <u>75</u> | Good | Comp. ex. |
| 70 | <u>U</u> | GA | 4 | 1053 | 16.7 | 24 | <u>86</u> | Good | Comp. ex. |
| 71 | <u>V</u> | GA | 2 | 1100 | 20.5 | 10 | <u>71</u> | Good | Comp. ex. |
| 72 | <u>W</u> | GA | 7 | <u>813</u> | 31.0 | 26 | 1<u>29</u> | Good | Comp. ex. |
| 73 | <u>X</u> | GA | 2 | 1<u>202</u> | 15.7 | 20 | <u>84</u> | Good | Comp. ex. |
| 74 | <u>Y</u> | GA | 5 | 1045 | 16.8 | 21 | <u>80</u> | Good | Comp. ex. |
| 75 | <u>Z</u> | GA | 2 | 1066 | 17.9 | 21 | <u>87</u> | Good | Comp. ex. |
| 76 | A | GI | 3 | 1028 | 24.3 | 26 | 1<u>27</u> | Good | Ex. |
| 77 | B | GI | 4 | 1020 | 23.3 | 25 | 119 | Good | Ex. |
| 78 | C | GI | 5 | 1002 | 17.5 | 42 | 114 | Good | Ex. |
| 79 | D | GI | 10 | 993 | 22.2 | 28 | 117 | Good | Ex. |
| 80 | E | GI | 5 | 1059 | 18.0 | 30 | 104 | Good | Ex. |
| 81 | F | GI | 5 | 996 | 24.7 | 29 | 132 | Good | Ex. |
| 82 | G | GI | 4 | 1129 | 15.9 | 30 | 98 | Good | Ex. |
| 83 | H | GI | 8 | 1025 | 22.4 | 27 | 119 | Good | Ex. |
| 84 | I | GI | 7 | 1191 | 17.0 | 39 | 126 | Good | Ex. |
| 85 | J | GI | 5 | 1208 | 15.4 | 53 | 135 | Good | Ex. |
| 86 | K | GI | 5 | 1312 | 10.5 | 56 | 103 | Good | Ex. |
| 87 | L | GI | 6 | 1224 | 10.7 | 54 | 96 | Good | Ex. |
| 88 | M | GI | 4 | 1236 | 14.1 | 38 | 107 | Good | Ex. |
| 89 | N | GI | 2 | 1199 | 15.8 | 40 | 120 | Good | Ex. |
| 90 | O | GI | 3 | 1153 | 14.3 | 43 | 108 | Good | Ex. |
| 91 | P | GI | 3 | 1210 | 17.0 | 39 | 128 | Good | Ex. |

Underlines show outside scope of present invention

Comparative Examples 2 to 8 and 10 to 16 do not have descaling conditions in the rough rolling or finish rolling, cooling conditions after the end of the final descaling, or pickling conditions controlled to within the predetermined ranges, therefore the area ratio of regions with an $Al_S/Si_S$ ratio of 0.2 or less became more than 50% and as a result cracking occurred at the spot welded parts.

Comparative Example 9 had a low number of rolling passes with rolling reductions of more than 20% in the rough rolling, therefore the nonrecrystallized rate increased and the press-formability was poor. It is believed that in Comparative Example 9, there was insufficient strain induced precipitation of AlN in the rough rolling, fine, relatively large amounts of AlN particles precipitated in the subsequent finish rolling, and recrystallization of ferrite was inhibited at the time of heat treatment due to the pinning effect by such AlN particles. Comparative Example 17 had a low peak heating temperature in the heat treatment step, therefore the ferrite content increased and the press-formability was poor. Comparative Example 18 had a high average heating speed in the heat treatment step, therefore the nonrecrystallized rate increased and the press-formability was poor. Comparative Example 19 was high in cooling stop temperature in the heat treatment step, therefore tempered martensite was not formed and the press-formability was poor. Comparative Example 20 was low in cooling stop temperature in the heat treatment step, therefore the retained austenite content decreased and the press-formability was poor. Comparative Example 21 was low in low temperature holding temperature in the heat treatment step, therefore a sufficient retained austenite content was not obtained and the press-formability was poor. Comparative Example 22 was short in low temperature holding time in the heat treatment step, therefore similarly a sufficient retained austenite content was not obtained and the press-formability was poor. Comparative Example 23 was low in average cooling speed in the 550 to 650° C. temperature range in the heat treatment step, therefore the ferrite content increased and the press-formability was poor. Comparative Example 32 was high in low temperature holding temperature in the heat treatment step, therefore a sufficient retained austenite content was not obtained and the press-formability was poor. Comparative Examples 40 to 49 and 66 to 75 had chemical compositions not controlled to within the predetermined ranges, therefore the press-formability and the LME cracking resistance of the spot welded parts were poor. In particular, Comparative Examples 48 and 74 did not contain Ti, therefore the nonrecrystallized rates increased and the press-formabilities were poor. It is believed that since Ti was not added, the solute N in the steel could not be fixed as TiN and fine, relatively large amount of AlN particles were formed and recrystallization of ferrite was inhibited at the time of the heat treatment due to their pinning effect.

In contrast to this, the steel sheets of the working examples have a TS of 980 MPa or more and a $TS \times El \times \lambda^{0.5}/1000$ of 90 or more and further are excellent in test results of the LME cracking resistance of spot welded parts, therefore are understood to be excellent in press-formability and the LME cracking resistance of spot welded parts.

The invention claimed is:

1. A steel sheet having a chemical composition comprising, by mass %,
C: 0.15 to 0.30%,
Si: 0.30 to 1.50%,
Mn: 1.40 to 3.49%,
P: 0.050% or less,
S: 0.0100% or less,
Al: 0.30 to 1.50%,
Ti: 0.001 to 0.100%,
N: 0.0100% or less,
O: 0.0100% or less,
Cr: 0 to 1.00%,
Mo: 0 to 1.00%,
Cu: 0 to 1.00%, Ni: 0 to 1.00%,
Co: 0 to 1.00%,
W: 0 to 1.00%,
Sn: 0 to 1.00%,
Sb: 0 to 0.50%,
Nb: 0 to 0.200%,
V: 0 to 1.00%,
B: 0 to 0.0050%,
Ca: 0 to 0.0100%,
Mg: 0 to 0.0100%,
Ce: 0 to 0.0150%,
Zr: 0 to 0.0100%,
La: 0 to 0.0150%,
Hf: 0 to 0.0100%,
Bi: 0 to 0.0100%,
REM other than Ce and La: 0 to 0.0100%, and
balance: Fe and impurities, and
a steel microstructure in a range of ⅛ thickness to ⅜ thickness centered on ¼ thickness from the surface comprising, by vol %,
ferrite: 1 to 50%,
ratio of nonrecrystallized ferrite in the ferrite: 0 to 50%,
tempered martensite: 1% or more,
retained austenite: 5% or more,
fresh martensite: 0 to 10%,
total of pearlite and cementite: 0 to 5%, and
balance: bainite, and
when analyzing the surface by an EPMA, an area ratio of regions with an $Al_S/Si_S$ ratio of 0.2 or less is 50% or less, and a tensile strength is 980 MPa or more,
where $Al_S$ is a surface Al concentration (mass %), and $Si_S$ is a surface Si concentration (mass %).

2. The steel sheet according to claim 1, wherein the chemical composition comprises, by mass %, one or more of:
Cr: 0.001 to 1.00%,
Mo: 0.001 to 1.00%,
Cu: 0.001 to 1.00%,
Ni: 0.001 to 1.00%,
Co: 0.001 to 1.00%,
W: 0.001 to 1.00%,
Sn: 0.001 to 1.00%,
Sb: 0.001 to 0.50%,
Nb: 0.001 to 0.200%,
V: 0.001 to 1.00%,
B: 0.0001 to 0.0050%,
Ca: 0.0001 to 0.0100%,
Mg: 0.0001 to 0.0100%,
Ce: 0.0001 to 0.0100%,
Zr: 0.0001 to 0.0100%,
La: 0.0001 to 0.0100%,
Hf: 0.0001 to 0.0100%,
Bi: 0.0001 to 0.0100%, and
REM other than Ce and La: 0.0001 to 0.0100%.

3. The steel sheet according to claim 2, wherein the chemical composition satisfies the relationship of the following formula (1) and the ratio of nonrecrystallized ferrite in the ferrite is 10% or less:

$$[N]-(14.01/47.88)\cdot[Ti]\leq 0 \quad (1)$$

where [N] is the N content (mass %) and [Ti] is the Ti content.

4. The steel sheet according to claim 3, having a hot dip galvanized layer or hot dip galvannealed layer on its surface.

5. The steel sheet according to claim 2, having a hot dip galvanized layer or hot dip galvannealed layer on its surface.

6. The steel sheet according to claim 1, wherein the chemical composition satisfies the relationship of the following formula (1) and the ratio of nonrecrystallized ferrite in the ferrite is 10% or less:

$$[N]-(14.01/47.88)\cdot[Ti]\leq 0 \quad (1)$$

where [N] is the N content (mass %) and [Ti] is the Ti content.

7. The steel sheet according to claim 6, having a hot dip galvanized layer or hot dip galvannealed layer on its surface.

8. The steel sheet according to claim 1, having a hot dip galvanized layer or hot dip galvannealed layer on its surface.

9. A method for producing the steel sheet according to claim 1, comprising:
(A) a hot rolling step comprising rough rolling and finish rolling a slab having the chemical composition according to claim 1, wherein the hot rolling step satisfies the conditions of the following (A1) to (A4):
(A1) in the rough rolling, rolling at a steel sheet temperature of 1050 to 1200° C. and a rolling reduction per pass of more than 20% is performed at least two times,
(A2) in the rough rolling, high pressure water descaling satisfying pressure: 10 MPa or more, distance between steel sheet and nozzle tip: 500 mm or less, and angle formed by orientation of nozzle and thickness direction of steel sheet: 3 to 15 degrees is performed at least one time within 10 seconds after being rolled by a rolling pass at a steel sheet temperature of 1050 to 1200° C. and a rolling reduction of more than 20%,
(A3) in the finish rolling, high pressure water descaling satisfying pressure: 2 MPa or more, distance between steel sheet and nozzle tip: 400 mm or less, and angle formed by orientation of nozzle and thickness direction of steel sheet: 3 to 15 degrees is performed at least one time within 3.0 seconds after being rolled by a rolling pass at a steel sheet temperature of 950 to 1100° C. and a rolling reduction of more than 30%,
(A4) an elapsed time (s) after a final descaling and until the steel sheet reaches 700° C. satisfies the following formula (2):

$$0.03 \leq \sum_{t}^{t_f} 10^3 \cdot \sqrt{0.000631 \cdot \exp\left[-\frac{169,000}{8.314\cdot\{T(t)+273\}}\right]} \cdot \Delta t \leq 0.30 \quad (2)$$

t: elapsed time (s) from end of final descaling
T(t): steel sheet temperature (C) at elapsed time "t"
$t_f$: elapsed time (s) after final descaling and until steel sheet reaches 700° C.
(B) a pickling step comprising performing bending/unbending deformation on the obtained hot rolled steel sheet at least one time and then performing pickling running the hot rolled steel sheet through a temperature 70 to 90° C. aqueous solution containing 1.0 to 5.0 mol/L of HCl and less than 3.0 mol/L of $Fe^{2+}$ at an average speed of 10 m/min or more for 30 seconds or more,
(C) a cold rolling step of cold rolling the pickled hot rolled steel sheet at a rolling reduction of 30 to 75%,
(D) a heat treatment step comprising heat treating the obtained cold rolled steel sheet, wherein the heat treatment step satisfies the conditions of the following (D1) to (D5):

(D1) an average heating speed at 650 to Ac1° C. is 1.0 to 5.0° C./s, (D2) the cold rolled steel sheet is held at a peak heating temperature of Ac1+30 to 950° C. for 1 to 500 seconds (soaking), (D3) the soaked cold rolled steel sheet is cooled so that an average cooling speed at a temperature range of 550 to 650° C. is 10 to 100° C./s (first cooling), (D4) the cooling is stopped at Ms-150 to Ms° C. (second cooling), (D5) the cold rolled steel sheet after the second cooling is heated to a temperature region of 330 to 450° C., then held at the temperature region for 50 to 1000 seconds (low temperature holding).

10. The method for producing the steel sheet according to claim 9, further comprising hot dip galvanizing or hot dip galvannealing the steel sheet after the first cooling of (D3), the second cooling of (D4), or the low temperature holding of (D5).

11. A method for producing the steel sheet according to claim 2, comprising:

(A) a hot rolling step comprising rough rolling and finish rolling a slab having the chemical composition according to claim 2, wherein the hot rolling step satisfies the conditions of the following (A1) to (A4):

(A1) in the rough rolling, rolling at a steel sheet temperature of 1050 to 1200° C. and a rolling reduction per pass of more than 20% is performed at least two times, (A2) in the rough rolling, high pressure water descaling satisfying pressure: 10 MPa or more, distance between steel sheet and nozzle tip: 500 mm or less, and angle formed by orientation of nozzle and thickness direction of steel sheet: 3 to 15 degrees is performed at least one time within 10 seconds after being rolled by a rolling pass at a steel sheet temperature of 1050 to 1200° C. and a rolling reduction of more than 20%, (A3) in the finish rolling, high pressure water descaling satisfying pressure: 2 MPa or more, distance between steel sheet and nozzle tip: 400 mm or less, and angle formed by orientation of nozzle and thickness direction of steel sheet: 3 to 15 degrees is performed at least one time within 3.0 seconds after being rolled by a rolling pass at a steel sheet temperature of 950 to 1100° C. and a rolling reduction of more than 30%, (A4) an elapsed time (s) after a final descaling and until the steel sheet reaches 700° C. satisfies the following formula (2):

$$0.03 \leq \sum_{t}^{t_f} 10^3 \cdot \sqrt{0.000631 \cdot \exp\left[-\frac{169,000}{8.314 \cdot \{T(t)+273\}}\right]} \cdot \Delta t \leq 0.30 \quad (2)$$

t: elapsed time (s) from end of final descaling
T(t): steel sheet temperature (° C.) at elapsed time "t"
$t_f$: elapsed time (s) after final descaling and until steel sheet reaches 700° C.

(B) a pickling step comprising performing bending/unbending deformation on the obtained hot rolled steel sheet at least one time and then performing pickling running the hot rolled steel sheet through a temperature 70 to 90° C. aqueous solution containing 1.0 to 5.0 mol/L of HCl and less than 3.0 mol/L of $Fe^{2+}$ at an average speed of 10 m/min or more for 30 seconds or more, (C) a cold rolling step of cold rolling the pickled hot rolled steel sheet at a rolling reduction of 30 to 75%, (D) a heat treatment step comprising heat treating the obtained cold rolled steel sheet, wherein the heat treatment step satisfies the conditions of the following (D1) to (D5):

(D1) an average heating speed at 650 to Ac1° C. is 1.0 to 5.0° C./s, (D2) the cold rolled steel sheet is held at a peak heating temperature of Ac1+30 to 950° C. for 1 to 500 seconds (soaking), (D3) the soaked cold rolled steel sheet is cooled so that an average cooling speed at a temperature range of 550 to 650° C. is 10 to 100° C./s (first cooling), (D4) the cooling is stopped at Ms-150 to Ms° C. (second cooling), (D5) the cold rolled steel sheet after the second cooling is heated to a temperature region of 330 to 450° C., then held at the temperature region for 50 to 1000 seconds (low temperature holding).

12. The method for producing the steel sheet according to claim 11, further comprising hot dip galvanizing or hot dip galvannealing the steel sheet after the first cooling of (D3), the second cooling of (D4), or the low temperature holding of (D5).

13. A method for producing the steel sheet according to claim 6, comprising:

(A) a hot rolling step comprising rough rolling and finish rolling a slab having the chemical composition according to claim 6, wherein the hot rolling step satisfies the conditions of the following (A1) to (A4):

(A1) in the rough rolling, rolling at a steel sheet temperature of 1050 to 1200° C. and a rolling reduction per pass of more than 20% is performed at least two times, (A2) in the rough rolling, high pressure water descaling satisfying pressure: 10 MPa or more, distance between steel sheet and nozzle tip: 500 mm or less, and angle formed by orientation of nozzle and thickness direction of steel sheet: 3 to 15 degrees is performed at least one time within 10 seconds after being rolled by a rolling pass at a steel sheet temperature of 1050 to 1200° C. and a rolling reduction of more than 20%, (A3) in the finish rolling, high pressure water descaling satisfying pressure: 2 MPa or more, distance between steel sheet and nozzle tip: 400 mm or less, and angle formed by orientation of nozzle and thickness direction of steel sheet: 3 to 15 degrees is performed at least one time within 3.0 seconds after being rolled by a rolling pass at a steel sheet temperature of 950 to 1100° C. and a rolling reduction of more than 30%, (A4) an elapsed time (s) after a final descaling and until the steel sheet reaches 700° C. satisfies the following formula (2):

$$0.03 \leq \sum_{t}^{t_f} 10^3 \cdot \sqrt{0.000631 \cdot \exp\left[-\frac{169,000}{8.314 \cdot \{T(t)+273\}}\right]} \cdot \Delta t \leq 0.30 \quad (2)$$

t: elapsed time (s) from end of final descaling
T(t): steel sheet temperature (° C.) at elapsed time "t"
$t_f$: elapsed time (s) after final descaling and until steel sheet reaches 700° C.
(B) a pickling step comprising performing bending/unbending deformation on the obtained hot rolled steel sheet at least one time and then performing pickling running the hot rolled steel sheet through a temperature 70 to 90° C. aqueous solution containing 1.0 to 5.0 mol/L of HCl and less than 3.0 mol/L of $Fe^{2+}$ at an average speed of 10 m/min or more for 30 seconds or more,
(C) a cold rolling step of cold rolling the pickled hot rolled steel sheet at a rolling reduction of 30 to 75%,
(D) a heat treatment step comprising heat treating the obtained cold rolled steel sheet, wherein the heat treatment step satisfies the conditions of the following (D1) to (D5):
  (D1) an average heating speed at 650 to Ac1° C. is 1.0 to 5.0° C./s,
  (D2) the cold rolled steel sheet is held at a peak heating temperature of Ac1+30 to 950° C. for 1 to 500 seconds (soaking),
  (D3) the soaked cold rolled steel sheet is cooled so that an average cooling speed at a temperature range of 550 to 650° C. is 10 to 100° C./s (first cooling),
  (D4) the cooling is stopped at Ms-150 to Ms° C. (second cooling),
  (D5) the cold rolled steel sheet after the second cooling is heated to a temperature region of 330 to 450° C., then held at the temperature region for 50 to 1000 seconds (low temperature holding).

14. The method for producing the steel sheet according to claim 13, further comprising hot dip galvanizing or hot dip galvannealing the steel sheet after the first cooling of (D3), the second cooling of (D4), or the low temperature holding of (D5).

15. A method for producing the steel sheet according to claim 3, comprising:
(A) a hot rolling step comprising rough rolling and finish rolling a slab having the chemical composition according to claim 3, wherein the hot rolling step satisfies the conditions of the following (A1) to (A4):
  (A1) in the rough rolling, rolling at a steel sheet temperature of 1050 to 1200° C. and a rolling reduction per pass of more than 20% is performed at least two times,
  (A2) in the rough rolling, high pressure water descaling satisfying pressure: 10 MPa or more, distance between steel sheet and nozzle tip: 500 mm or less, and angle formed by orientation of nozzle and thickness direction of steel sheet: 3 to 15 degrees is performed at least one time within 10 seconds after being rolled by a rolling pass at a steel sheet temperature of 1050 to 1200° C. and a rolling reduction of more than 20%,
  (A3) in the finish rolling, high pressure water descaling satisfying pressure: 2 MPa or more, distance between steel sheet and nozzle tip: 400 mm or less, and angle formed by orientation of nozzle and thickness direction of steel sheet: 3 to 15 degrees is performed at least one time within 3.0 seconds after being rolled by a rolling pass at a steel sheet temperature of 950 to 1100° C. and a rolling reduction of more than 30%,
  (A4) an elapsed time (s) after a final descaling and until the steel sheet reaches 700° C. satisfies the following formula (2):

$$0.03 \le \sum_{t}^{t_f} 10^3 \cdot \sqrt{0.000631 \cdot \exp\left[-\frac{169,000}{8.314 \cdot \{T(t)+273\}}\right]} \cdot \Delta t \le 0.30 \quad (2)$$

t: elapsed time (s) from end of final descaling
T(t): steel sheet temperature (° C.) at elapsed time "t"
$t_f$: elapsed time (s) after final descaling and until steel sheet reaches 700° C.
(B) a pickling step comprising performing bending/unbending deformation on the obtained hot rolled steel sheet at least one time and then performing pickling running the hot rolled steel sheet through a temperature 70 to 90° C. aqueous solution containing 1.0 to 5.0 mol/L of HCl and less than 3.0 mol/L of $Fe^{2+}$ at an average speed of 10 m/min or more for 30 seconds or more,
(C) a cold rolling step of cold rolling the pickled hot rolled steel sheet at a rolling reduction of 30 to 75%,
(D) a heat treatment step comprising heat treating the obtained cold rolled steel sheet, wherein the heat treatment step satisfies the conditions of the following (D1) to (D5):
  (D1) an average heating speed at 650 to Ac1° C. is 1.0 to 5.0° C./s,
  (D2) the cold rolled steel sheet is held at a peak heating temperature of Ac1+30 to 950° C. for 1 to 500 seconds (soaking),
  (D3) the soaked cold rolled steel sheet is cooled so that an average cooling speed at a temperature range of 550 to 650° C. is 10 to 100° C./s (first cooling),
  (D4) the cooling is stopped at Ms-150 to Ms° C. (second cooling),
  (D5) the cold rolled steel sheet after the second cooling is heated to a temperature region of 330 to 450° C., then held at the temperature region for 50 to 1000 seconds (low temperature holding).

16. The method for producing the steel sheet according to claim 15, further comprising hot dip galvanizing or hot dip galvannealing the steel sheet after the first cooling of (D3), the second cooling of (D4), or the low temperature holding of (D5).

* * * * *